United States Patent
Kubota et al.

(10) Patent No.: US 10,209,489 B2
(45) Date of Patent: Feb. 19, 2019

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Hisao Fukaya, Tochigi (JP)

(73) Assignee: KANTATSU CO., LTD., Tochigi (JP)

( * ) Notice: Subject to any disclaimer, the term of this patent is extended or adjusted under 35 U.S.C. 154(b) by 0 days.

(21) Appl. No.: 15/648,456

(22) Filed: Jul. 13, 2017

(65) Prior Publication Data
US 2018/0059378 A1    Mar. 1, 2018

(30) Foreign Application Priority Data
Aug. 29, 2016   (JP) .................................. 2016-166945

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC ...... G02B 13/0045; G02B 13/18; G02B 9/62; G02B 27/0025
See application file for complete search history.

(56) References Cited

U.S. PATENT DOCUMENTS

| | | | |
|---|---|---|---|
| 9,488,808 B1 | 11/2016 | Chen et al. | |
| 9,575,294 B2 * | 2/2017 | Kubota | G02B 13/0045 |
| 9,798,113 B2 * | 10/2017 | Kubota | G02B 13/0045 |
| 9,804,359 B2 * | 10/2017 | Kubota | G02B 9/62 |
| 2015/0177489 A1 | 6/2015 | Hashimoto | |
| 2015/0241665 A1 | 8/2015 | Hashimoto | |
| 2016/0170182 A1 | 6/2016 | Tanaka | |

(Continued)

FOREIGN PATENT DOCUMENTS

| | | |
|---|---|---|
| CN | 103576297 A | 2/2014 |
| CN | 204178039 U | 2/2015 |
| CN | 204422848 U | 6/2015 |

(Continued)

*Primary Examiner* — William R Alexander
*Assistant Examiner* — Tamara Y Washington
(74) *Attorney, Agent, or Firm* — Kubotera & Associates, LLC

(57) ABSTRACT

An imaging lens includes a first lens having positive refractive power; a second lens having negative refractive power; a third lens having positive refractive power; a fourth lens; a fifth lens having negative refractive power; and a sixth lens having negative refractive power, arranged in this order from an object side to an image plane side. The sixth lens is formed in a shape so that a surface on the object side and a surface on the image plane side have negative curvature radii. The first lens has a specific focal length, the second lens has a specific focal length, the fourth lens is arranged to be away from the fifth lens by a specific distance on an optical axis, and the surface of the sixth lens on the image plane side has a specific curvature radius so that specific conditional expressions are satisfied.

19 Claims, 18 Drawing Sheets

(56) References Cited

U.S. PATENT DOCUMENTS

| | | |
|---|---|---|
| 2017/0351061 A1 | 12/2017 | Chang et al. |
| 2018/0024322 A1 | 1/2018 | Chen et al. |
| 2018/0052303 A1 | 2/2018 | Tang et al. |
| 2018/0052304 A1 | 2/2018 | Wu et al. |

FOREIGN PATENT DOCUMENTS

| | | |
|---|---|---|
| CN | 105807407 A | 7/2016 |
| CN | 2005844609 U | 12/2016 |
| CN | 106324799 A | 1/2017 |
| JP | 2013-195587 A | 9/2013 |
| TW | I548895 B | 9/2016 |

* cited by examiner

IMAGING LENS

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a cellular phone, a portable information terminal, or the like, a digital still camera, a security camera, a vehicle onboard camera, and a network camera.

In these years, in place of cellular phones that are intended mainly for making phone calls, so-called "smartphones", i.e., multifunctional cellular phones which can run various application software as well as a voice call function, have been more widely used. When application software is run on smartphones, it is possible to perform functions such as those of digital still cameras and car navigation systems on the smartphones. In order to perform those various functions, most models of smartphones include cameras.

Generally speaking, product groups of such smartphones are often designed according to specifications intended for users ranging from beginners to advanced users. Among the product groups, an imaging lens to be mounted in a product designed for the advanced users is required to have a high-resolution lens configuration so as to be also applicable to a high pixel count imaging element of these years, as well as a small size.

As a method of attaining the high-resolution imaging lens, there has been a method of increasing the number of lenses that compose the imaging lens. However, the increase of the number of lenses easily causes an increase in the size of the imaging lens. Therefore, the lens configuration having a large number of lenses has a disadvantage in terms of mounting in a small-sized camera such as the above-described smartphones. Accordingly, in development of the imaging lens, it has been necessary to attain high resolution of the imaging lens, while limiting the number of lenses that compose the imaging lens.

In recent years, with advancement of technology to attain a high pixel count of an imaging element, technology for manufacturing lenses has been also dramatically advanced. Therefore, it is achievable to produce a smaller sized imaging lens which is equivalent to a conventional imaging lens in terms of the number of lenses. For this reason, the number of lenses that compose the imaging lens tends to increase in comparison with that of a conventional imaging lens. However, due to limitation to a space inside a camera to mount the imaging lens, it is getting more important to achieve both downsizing of the imaging lens and high resolution of the imaging lens, i.e., satisfactory correction of aberrations, in a more balanced manner.

In case of a lens configuration composed of six lenses, due to the large number of lenses of the imaging lens, it has high flexibility in design. In addition, it is achievable to attain downsizing of the imaging lens and satisfactory correction of aberrations in a balanced manner, which is necessary for the high-resolution imaging lenses. For example, as the imaging lens having the six-lens configuration as described above, an imaging lens described in Patent Reference has been known.

Patent Reference: Japanese Patent Application Publication No. 2013-195587

The imaging lens described in Patent Reference includes a first lens that is positive and directs a convex surface thereof to an object side; a second lens that is negative and directs a concave surface thereof to an image plane side; a third lens that is negative and directs a concave surface thereof to the object side; fourth and fifth lenses that are positive and direct convex surfaces thereof to the image plane side; and a sixth lens that is negative and directs a concave surface thereof to the object side. According to the conventional imaging lens of Patent Reference, by satisfying conditional expressions of a ratio between a focal length of the first lens and a focal length of the third lens and a ratio between a focal length of the second lens and a focal length of the whole lens system, it is achievable to satisfactorily correct a distortion and a chromatic aberration.

Each year, functions and sizes of the cellular phones and smartphones are getting higher and smaller, and the level of a small size required for an imaging lens is even higher than before. In case of the imaging lens of Patent Reference, since a distance from an object-side surface of the first lens to an image plane of an imaging element is long, there is a limit to achieve satisfactory correction of aberrations while further downsizing the imaging lens to satisfy the above-described demands. Here, it is achievable to reduce the level of downsizing required for an imaging lens by providing a camera as a separate unit from the cellular phones or smartphones. However, in terms of convenience or portability, the cellular phones or smartphones with built-in cameras are still dominantly preferred. Therefore, there remains such a strong demand for small imaging lenses with high resolution.

Such a problem is not specific to the imaging lens to be mounted in cellular phones and smartphones. Rather, it is a common problem even for an imaging lens to be mounted in a relatively small camera such as digital still cameras, portable information terminals, security cameras, vehicle onboard cameras, and network cameras.

In view of the above-described problems in conventional techniques, an object of the present invention is to provide an imaging lens that can attain both downsizing thereof and satisfactory aberration correction.

Further objects and advantages of the present invention will be apparent from the following description of the invention.

SUMMARY OF THE INVENTION

In order to attain the objects described above, according to a first aspect of the present invention, there is provided an imaging lens that forms an image of an object on an imaging element. The imaging lens of the invention includes a first lens having positive refractive power; a second lens having negative refractive power; a third lens having positive refractive power; a fourth lens; a fifth lens having negative refractive power; and a sixth lens having negative refractive power, arranged in the order from an object side to an image plane side. According to the first aspect of the invention, the sixth lens is formed in a shape so as to have negative curvature radii both on the object-side surface thereof and image plane-side surface thereof. When the whole lens system has the focal length f, the first lens has a focal length f1, the second lens has a focal length f2, and a distance along the optical axis between the fourth lens and the fifth lens is D45, the imaging lens of the invention preferably satisfies the following conditional expressions (1) and (2):

$$f1 < |f2| \tag{1}$$

$$0.02 < D45/f < 0.5 \tag{2}$$

As is well known, as an issue specific to an imaging lens that forms an image of an object on an imaging element, there is the one that a part of light beams emitted from the imaging lens is reflected by an image plane of the imaging element, by a cover glass in many cases, and enters from a lens on the image plane side of the imaging lens. The reflected light from the imaging element causes flare, which results in deterioration of optical performance of the imaging lens. Because of this, according to the imaging lens of the invention, the sixth lens is formed in a shape such that curvature radii of an object-side surface and an image plane-side surface are both negative, i.e. so as to be formed in a shape of a meniscus lens directing a concave surface thereof to the object side near the optical axis. For this reason, the lens disposed at a position that is closest to the image plane side has a shape that directs a convex surface thereof to the image plane side. As a result, it is achievable to suitably restrain entrance of the reflected light to inside of the imaging lens and thereby it is achievable to obtain satisfactory image-forming performance.

In addition, as shown in the conditional expression (1), according to the imaging lens of the invention, the refractive power of the first lens having positive refractive power is stronger than that of the second lens having negative refractive power. According to the invention, the lens disposed at a position closest to the object side in the imaging lens has strong refractive power. As a result, it is achievable to compress the total length of the imaging lens, so that it is achievable to suitably attain downsizing of the imaging lens. Here, according to the imaging lens of the invention, the first lens preferably has the strongest refractive power among all the lenses that compose the imaging lens.

When the imaging lens satisfies the conditional expression (2), it is achievable to satisfactorily correct astigmatism and a field curvature. When the value exceeds the upper limit of "0.5", a tangential image surface and a sagittal image surface in astigmatism both tilt to the image plane side, and an astigmatic difference increases. As a result, the field curvature is excessively corrected and it is difficult to obtain satisfactory image-forming performance. On the other hand, when the value is below the lower limit of "0.02", the tangential image surface and the sagittal image surface in astigmatism both tilt to the object side, and an astigmatic difference increases. As a result, the field curvature is insufficiently corrected, and it is difficult to obtain satisfactory image-forming performance.

According to a second aspect of the invention, the imaging lens having the above-described configuration preferably further satisfies the following conditional expression (2A) to satisfactorily correct aberrations.

$$0.03 < D45/f < 0.5 \quad (2A)$$

According to a third aspect of the invention, the imaging lens having the above-described configuration preferably further satisfies the following conditional expression (2B) to more satisfactorily correct aberrations.

$$0.05 < D45/f < 0.5 \quad (2B)$$

According to a fourth aspect of the invention, when a curvature radius of the object-side surface of the sixth lens is R6f and a curvature radius of the image plane-side surface of the sixth lens is R6r, the imaging lens of the invention preferably satisfies the following conditional expression (3):

$$3 < |R6r/R6f| < 150 \quad (3)$$

When the imaging lens satisfies the conditional expression (3), it is achievable to satisfactorily correct the chromatic aberration and the astigmatism. When the value exceeds the upper limit of 150, it is easy to correct the axial chromatic aberration. However, a chromatic aberration of magnification is excessively corrected (an image-forming point at a short wavelength moves in a direction to be away from the optical axis in comparison with an image-forming point at a reference wavelength). Therefore, it is difficult to obtain satisfactory image-forming performance. On the other hand, when the value is below the lower limit of "3", it is easy to correct the chromatic aberration of magnification. However, the astigmatic difference increases, so that it is difficult to obtain satisfactory image-forming performance.

According to a fifth aspect of the invention, when a curvature radius of the image plane-side surface of the sixth lens is R6r, the imaging lens having the above-described configuration preferably satisfies the following conditional expression (4):

$$-80 < R6r/f < -5 \quad (4)$$

When the imaging lens satisfies the conditional expression (4), it is achievable to restrain the distortion, the astigmatism, and the chromatic aberration respectively within satisfactory ranges in a balanced manner. When the value exceeds the upper limit of "−5", the distortion increases in a positive direction (towards the image plane side), and the chromatic aberration of magnification is excessively corrected. Moreover, in the astigmatism, the tangential image surface curves to the image plane side and the astigmatic difference increases. For this reason, it is difficult to obtain satisfactory image-forming performance. On the other hand, when the value is below the lower limit of "−80", it is advantageous for correction of the distortion and the chromatic aberration of magnification. However, in the astigmatism, the tangential image surface and the sagittal image surface both tilt to the object side, and are insufficiently corrected. As a result, the astigmatic difference increases, and it is difficult to obtain satisfactory image-forming performance.

According to a sixth aspect, the imaging lens having the above-described configuration preferably satisfies the following conditional expression (5):

$$-1.0 < f1/f2 << 0.1 \quad (5)$$

When the imaging lens satisfies the conditional expression (5), it is achievable to satisfactorily correct the chromatic aberration, a spherical aberration, the astigmatism, and the field curvature, while downsizing the imaging lens. When the value exceeds the upper limit of "−0.1", it is advantageous for downsizing of the imaging lens. However, the spherical aberration is excessively corrected. In addition, in the astigmatism, the tangential image surface and the sagittal image surface are both insufficiently corrected, and the image-forming surface curves to the object side. As a result, the field curvature is insufficiently corrected, and it is difficult to obtain satisfactory image-forming performance.

On the other hand, when the value is below the lower limit of "−1.0", it is easy to secure the back focal length. However, it is difficult to downsize the imaging lens. Moreover, the axial chromatic aberration is excessively corrected (a focal position at a short wavelength moves to the image plane side relative to that at a reference wavelength). In addition, in the astigmatism, the tangential image surface and the sagittal image surface both tilt to the image plane side and are excessively corrected. As a result, the image-forming surface curves to the image plane side, and the field curvature is excessively corrected. Therefore, also in this case, it is difficult to obtain satisfactory image-forming performance.

According to a seventh aspect of the invention, the imaging lens having the above-described configuration preferably satisfies the following conditional expression (6):

$$-2.0 < f2/f < -0.5 \quad (6)$$

When the imaging lens satisfies the conditional expression (6), it is achievable to suitably correct a chromatic aberration, a coma aberration, and astigmatism in a balanced manner, while downsizing the imaging lens. When the value exceeds the upper limit of "−0.5", it is advantageous for downsizing of the imaging lens. However, the axial chromatic aberration and the chromatic aberration of magnification are both excessively corrected. In addition, in astigmatism, the tangential image surface is excessively corrected and the astigmatic difference increases. In addition, an inner coma aberration increases for off-axis light fluxes. For this reason, it is difficult to obtain satisfactory image-forming performance. On the other hand, when the value is below the lower limit of "−2.0", it is easy to secure the back focal length. However, it is difficult to downsize the imaging lens. In addition, in the astigmatism, the sagittal image surface is insufficiently corrected, and an outer coma aberration increases for off-axis light fluxes. Therefore, it is difficult to obtain satisfactory image-forming performance.

According to an eighth aspect of the invention, when the third lens has a focal length f3, the imaging lens having the above-described configuration preferably satisfies the following conditional expression (7):

$$1 < f3/f < 5 \quad (7)$$

When the imaging lens satisfies the conditional expression (7), it is achievable to satisfactorily correct the astigmatism and the field curvature. In addition, when the imaging lens satisfies the conditional expression (7), it is also achievable to restrain an incident angle of a light beam emitted from the imaging lens to the image plane of an imaging element within the range of a chief ray angle (CRA). As is well known, a so-called chief ray angle (CRA) is set in advance for an imaging element, i.e. a range of an incident angle of a light beam that can be taken in the image plane. When a light beam outside the range of CRA enters the imaging element, "shading" occurs, which is an obstacle for achieving satisfactory image-forming performance.

When the value exceeds the upper limit of "5" in the conditional expression (7), in the astigmatism, the tangential image surface and the sagittal image surface are both insufficiently corrected, and the field curvature is insufficiently corrected. For this reason, it is difficult to obtain satisfactory image-forming performance. Moreover, the incident angle of a light beam emitted from the imaging lens to the image plane is large, so that it is difficult to restrain the incident angle within the range of CRA.

On the other hand, when the value is below the lower limit of "1", it is easy to restrain the incident angle within the range of CRA. However, in the astigmatism, the sagittal image surface is excessively corrected, and the astigmatic difference increases. Therefore, also in this case, it is difficult to obtain satisfactory image-forming performance.

According to a ninth aspect of the invention, when a composite focal length of the fifth lens and the sixth lens is f56, the imaging lens having the above-described configuration preferably satisfies the following conditional expression (8):

$$-2.0 < f56/f < -0.1 \quad (8)$$

When the imaging lens satisfies the conditional expression (8), it is achievable to restrain the chromatic aberration, the astigmatism, and the field curvature respectively within preferred ranges, while downsizing the imaging lens. When the value exceeds the upper limit of "−0.1", it is advantageous for downsizing of the imaging lens. However, in the astigmatism, the sagittal image surface tilts to the object side, and the field curvature is insufficiently corrected. Moreover, the axial chromatic aberration is insufficiently corrected (a focal position at a short wavelength moves to the object side relative to that at a reference wavelength). In addition, the chromatic aberration of magnification is excessively corrected. For this reason, it is difficult to obtain satisfactory image-forming performance. On the other hand, when the value is below the lower limit of "−2.0", it is advantageous for correcting the chromatic aberration. However, it is difficult to downsize the imaging lens. In addition, in the astigmatism, the sagittal image surface tilts to the image plane side, so that the field curvature is excessively corrected. Therefore, it is difficult to obtain satisfactory image-forming performance.

According to a tenth aspect of the invention, when the sixth lens has a focal length f6, the imaging lens having the above-described configuration preferably satisfies the following conditional expression (9):

$$-3.0 < f6/f < -0.5 \quad (9)$$

When the imaging lens satisfies the conditional expression (9), it is achievable to satisfactorily correct the chromatic aberration, the distortion, and the astigmatism. In addition, it is also achievable to restrain the incident angle of a light beam emitted from the imaging lens to the image plane of the imaging element within the range of CRA. When the value exceeds the upper limit of "−0.5", it is advantageous for correction of the chromatic aberration. However, the chromatic aberration of magnification is excessively corrected and the distortion increases in the positive direction. Therefore, it is difficult to obtain satisfactory image-forming performance. Moreover, the incident angle of a light beam emitted from the imaging lens to the image plane is large, so that it is difficult to restrain the incident angle within the range of CRA.

On the other hand, when the value is below the lower limit of "−3.0", it is easy to restrain the incident angle within the range of CRA. However, in the astigmatism, the tangential image surface is excessively corrected and the astigmatic difference increases. Therefore, it is difficult to obtain satisfactory image-forming performance.

According to an eleventh aspect of the invention, when a distance along the optical axis between the second lens and the third lens is D23, the imaging lens having the above-described configuration preferably satisfies the following conditional expression (10):

$$0.01 < D23/f < 0.5 \quad (10)$$

When the imaging lens satisfies the conditional expression (10), it is achievable to restrain the astigmatism, the field curvature, and the distortion in a balanced manner. When the value exceeds the upper limit of "0.5", the distortion increases in the positive direction. Moreover, in the astigmatism, the tangential image surface and the sagittal image surface both tilt to the image plane side and astigmatic difference increases. Therefore, the field curvature is excessively corrected, and it is difficult to obtain satisfactory image-forming performance.

On the other hand, when the value is below the lower limit of "0.01", in the astigmatism, the tangential image surface and the sagittal image surface both tilt to the object side and the astigmatic difference increases. Therefore, the field curvature is insufficiently corrected. Therefore, also in this case, it is difficult to obtain satisfactory image-forming performance.

According to a twelfth aspect of the invention, when an effective diameter of the image plane-side surface of the third lens is Φ3, and an effective diameter of the image plane-side surface of the sixth lens is Φ6, the imaging lens of the invention preferably satisfies the following conditional expression (11):

$$1.5<\Phi6/\Phi3<3 \qquad (11)$$

When the imaging lens satisfies the conditional expression (11), it is achievable to restrain the incident angle of a light beam emitted from the imaging lens to the image plane of the imaging element within the range of CRA, while downsizing the imaging lens. When the value exceeds the upper limit of "3", the difference between the effective diameter Φ3 and the effective diameter Φ6 is large. Therefore, it is easy to shorten the distance along the optical axis from the object-side surface of the fourth lens to the image plane-side surface of the sixth lens. However, the incident angle of a light beam emitted from the imaging lens to the image plane is large. Therefore, it is difficult to restrain the incident angle within the range of CRA. On the other hand, when the value is below the lower limit of "1.5", it is easy to restrain the incident angle within the range of CRA. However, the sizes of the respective lenses, the first lens to the third lens, are large, so that it is difficult to downsize the imaging lens.

In these years, there is an increasing demand for taking images of a wider range through an imaging lens. In this case, the imaging lens is often required to have both a small size and a wider angle. Especially in case of an imaging lens to be built in a thin portable device, e.g. smartphone, it is necessary to be able to accommodate an imaging lens in a limited space. Therefore, there is often a strict limitation in a length of the imaging lens in a direction of an optical axis. According to a thirteenth aspect of the invention, when a distance along the optical axis from an object-side surface of the first lens to the image plane is La (air conversion length for an insert such as a cover glass) and the maximum image height of the image plane of the imaging element is Hmax, the imaging lens of the invention preferably satisfies the following conditional expression (12):

$$1.2<La/Hmax<1.8 \qquad (12)$$

In case of the imaging lens of the invention, it is preferred to have air (gaps filled with air) between the respective lenses, the first lens through the sixth lens, arranged as described above. With those air gaps between the lenses arranged as described above, the imaging lens of the invention will not include any joined lens. In such lens configuration, it is easy to form all the six lenses that compose the imaging lens from a plastic material(s). Therefore, it is achievable to suitably restrain the manufacturing cost of the imaging lens.

In case of the imaging lens of the invention, each lens is preferably formed to have an aspheric shape on both surfaces thereof. By forming both surfaces of each of the lenses as aspheric shapes, it is achievable to more satisfactorily correct aberrations from proximity of the optical axis of the lens to the periphery thereof.

According to a fourteenth aspect of the invention, when the first lens has an Abbe's number vd1, the second lens has an Abbe's number vd2, and the third lens has an Abbe's number vd3, in order to satisfactorily correct the chromatic aberration, the imaging lens having the above-described configuration preferably satisfies the following conditional expressions (13) through (15):

$$35<vd1<75 \qquad (13)$$

$$15<vd2<35 \qquad (14)$$

$$35<vd3<75 \qquad (15)$$

When the imaging lens satisfies the conditional expressions (13) through (15), the first and the third lenses, and the second lens are a combination of lenses made of low-dispersion material(s) and high-dispersion material(s). With such arrangement of Abbe's numbers and the arrangement "positive-negative-positive" of refractive powers of the respective lenses, the first lens through the third lens, it is achievable to more satisfactorily correct the chromatic aberration.

In the imaging lens having the above-described configuration, when the fourth lens has a positive refractive power, the curvature radius of the object-side surface of the second lens is preferably positive. There are two types of shapes, in which the curvature radius of the object-side surface is positive. One is a shape, in which the curvature radii of the object-side surface and the image plane-side surface are both positive. The other is a shape, in which the curvature radius of the object-side surface is positive and the curvature radius of the image plane-side surface is negative. Either of those shapes is preferred as the shape of the second lens. Here, the first one is a shape of a meniscus lens directing a convex surface thereof to the object side near the optical axis, and the second one is a shape of a biconvex lens near the optical axis.

According to a fifteenth aspect of the invention, when the fourth lens has a positive refractive power and the fourth lens has a focal length f4, the imaging lens having the above-described configuration preferably satisfies the following conditional expression (16):

$$0.5<f4/f<5.0 \qquad (16)$$

When the imaging lens satisfies the conditional expression (16), it is achievable to satisfactorily correct the distortion and the astigmatism while downsizing the imaging lens. In addition, when the imaging lens satisfies the conditional expression (15), it is also achievable to restrain an incident angle of a light beam emitted from the imaging lens to the image plane of an imaging element within the range of CRA. When the value exceeds the upper limit of "5.0", it is advantageous for downsizing of the imaging lens. However, the distortion increases in the positive direction, and it is difficult to obtain satisfactory image-forming performance. Moreover, the incident angle of a light beam emitted from the imaging lens to the image plane is large, so that it is difficult to restrain the incident angle within the range of CRA.

On the other hand, when the value is below the lower limit of "0.5", it is easy to secure the back focal length. However, it is difficult to downsize the imaging lens. The distortion increases in the negative direction (towards the object side). Moreover, in the astigmatism, the tangential image surface and the sagittal image surface both tilt to the object side and an astigmatic difference increases. At a middle part of an image, a coma aberration increases, which is difficult to correct. Therefore, it is difficult to obtain satisfactory image-forming performance.

According to a sixteenth aspect of the invention, when the fourth lens has a positive refractive power and the third lens has a focal length f3 and the fourth lens has a focal length f4, the imaging lens having the above-described configuration preferably satisfies the following conditional expression (17):

$$0.5 < f3/f4 < 4.5 \quad (17)$$

When the imaging lens satisfies the conditional expression (17), it is achievable to restrain the astigmatism, the field curvature, and the distortion in a balanced manner, while downsizing the imaging lens. In addition, when the imaging lens satisfies the conditional expression (17), it is also achievable to restrain an incident angle of a light beam emitted from the imaging lens to the image plane of an imaging element within the range of CRA. When the value exceeds the upper limit of "4.5", it is easy to restrain the incident angle of a light beam emitted from the imaging lens to the image plane within the range of CRA. However, in the astigmatism, the tangential image surface and the sagittal image surface are both insufficiently corrected, and the distortion increases in a negative direction. Therefore, it is difficult to obtain satisfactory image-forming performance.

On the other hand, when the value is below the lower limit of "0.5", it is advantageous for downsizing the imaging lens. However, in the astigmatism, the tangential image surface and the sagittal image surface are both excessively corrected. As a result, the image-forming surface curves to the image plane side, and the field curvature is excessively corrected. Therefore, also in this case, it is difficult to obtain satisfactory image-forming performance. Moreover, the incident angle of a light beam emitted from the imaging lens to the image plane is large, so that it is also difficult to restrain the incident angle within the range of CRA.

According to a seventeenth aspect of the invention, in case the fourth lens has a positive refractive power, when a composite focal length of the fourth lens and a fifth lens is f45, the imaging lens having the above-described configuration preferably satisfies the following conditional expression (18):

$$2 < f45/f < 8 \quad (18)$$

When the imaging lens satisfies the conditional expression (18), it is achievable to restrain the astigmatism, the field curvature, and the coma aberration in a balanced manner, while downsizing the imaging lens. In addition, when the imaging lens satisfies the conditional expression (18), it is also achievable to restrain an incident angle of a light beam emitted from the imaging lens to the image plane of an imaging element within the range of CRA. When the value exceeds the upper limit of "8", it is advantageous for downsizing of the imaging lens. However, since an inner coma aberration increases for the off-axis light fluxes, it is difficult to obtain satisfactory image-forming performance. Moreover, the incident angle of a light beam emitted from the imaging lens to the image plane is large, so that it is difficult to restrain the incident angle within the range of CRA.

On the other hand, when the value is below the lower limit of "2", it is easy to restrain the incident angle within the range of CRA. However, it is difficult to downsize the imaging lens. Moreover, in the astigmatism, a sagittal image surface tilts to the object side, so that the image-forming surface curves to the object side. As a result, the field curvature is insufficiently corrected. Moreover, an outer coma aberration for off-axis light fluxes also increases. Therefore, it is difficult to obtain satisfactory image-forming performance.

In the imaging lens having the above-described configuration, the image plane-side surface of the sixth lens is preferably formed as an aspheric shape, such that an absolute value of a curvature thereof monotonously increases as a distance from the optical axis in a direction perpendicular to the optical axis is longer.

As described above, in case of an imaging element, CRA is set in advance. Therefore, in order to obtain satisfactory image-forming performance, it is necessary to restrain the incident angle of a light beam emitted from the imaging lens to the image plane within the range of CRA. In order to attain further downsizing of the imaging lens, since the emitting angle of a light beam emitted from the image plane-side surface of the sixth lens is large near a periphery of the lens, it is difficult to restrain the incident angle to the image plane within the range of CRA over the whole image. On this point, in case of the sixth lens of the invention, the image plane-side surface thereof is formed as an aspheric shape, in which an absolute value of a curvature thereof increases as it goes to the periphery of the lens, i.e., formed in a shape such that a degree of the curve is large near the lens periphery. Therefore, it is achievable to keep the emitting angle of a light beam emitted from the lens periphery small, and it is achievable to suitably restrain the incident angle to the image plane within the range of CRA over the whole image. In addition, when the sixth lens has such shape, it is achievable to more suitably restrain entry of the reflected light from the image plane of the imaging element, etc. to inside of the imaging lens.

When the imaging lens of the invention has an angle of view 2ω, the imaging lens preferably satisfies 70°≤2ω. When the imaging lens satisfies the conditional expression, the imaging lens can have a wider angle of view, and it is suitably achievable to attain both downsizing of the imaging lens and wider angle of view of the imaging lens.

According to the present invention, as described above, the shapes of the lenses are specified using positive/negative signs of the curvature radii thereof. Whether the curvature radius of the lens is positive or negative is determined based on general definition. More specifically, taking a traveling direction of light as positive, if a center of a curvature radius is on the image plane side when viewed from a lens surface, the curvature radius is positive. If a center of a curvature radius is on the object side, the curvature radius is negative. Therefore, "an object side surface, a curvature radius of which is positive" means the object side surface is a convex surface. "An object side surface, a curvature radius of which is negative" means the object side surface is a concave surface. "An image plane side surface, a curvature radius of which is positive" means the image plane side surface is a concave surface. "An image plane side surface, a curvature radius of which is negative" means the image plane side surface is a convex surface. Here, a curvature radius used herein refers to a paraxial curvature radius, and may not fit to general shapes of the lenses in their sectional views all the time.

According to the imaging lens of the present invention, it is possible to provide a small-sized imaging lens that is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13, and 16 are schematic sectional views of the imaging lenses in Numerical Data Examples 1 to 6 according to the embodiment, respectively. Since the imaging lenses in those Numerical Data Examples have the same basic configuration, the lens configuration of the embodiment will be described with reference to the illustrative sectional view of Numerical Data Example 1.

Figure 1:
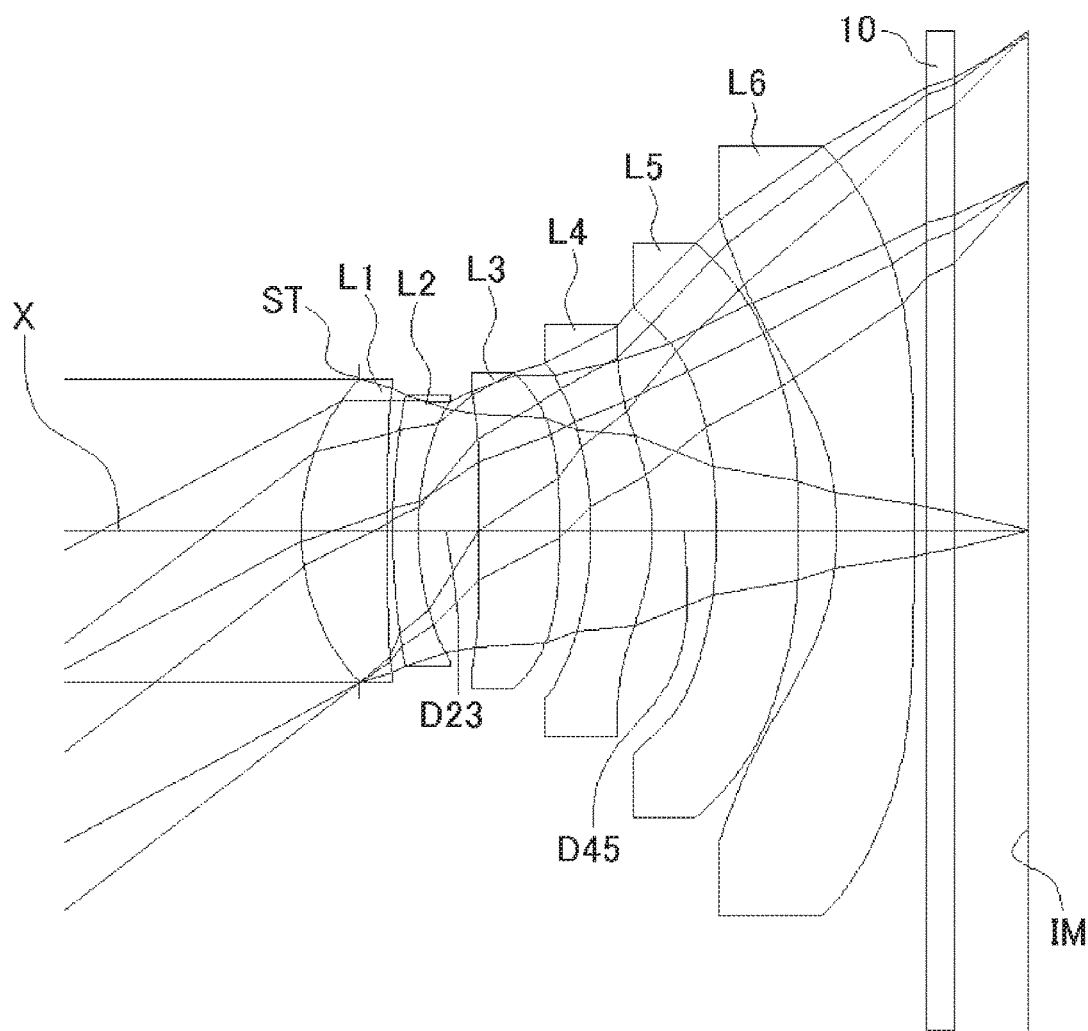
FIG. 1 shows a sectional view of a schematic configuration of an imaging lens in Numerical Data Example 1.

As shown in FIG. 1, according to the embodiment, the imaging lens includes a first lens L1 having positive refractive power, a second lens L2 having negative refractive power, a third lens L3 having positive refractive power, a fourth lens L4, a fifth lens L5 having negative refractive power, and a sixth lens L6 having negative refractive power, arranged in the order from an object side to an image plane side. Between the sixth lens L6 and an image plane IM of an imaging element, there is provided a filter 10. The filter 10 is omissible.

The first lens L1 is formed in a shape such that a curvature radius r1 of an object-side surface thereof and a curvature radius r2 of an image plane-side surface thereof are both positive, so as to have a shape of a meniscus lens directing a convex surface thereof to an object side near an optical axis X. The shape of the first lens L1 is not limited to the one in Numerical Data Example 1, and can be varied. Numerical Data Examples 2 through 6 are examples, in which the first lens L1 is formed in a shape, such that the curvature radius r2 of an image plane-side surface thereof is negative, i.e., so as to have a shape of a biconvex lens near an optical axis X. In addition to the above-described shape, for example, the first lens L1 also can be formed in a shape, such that the curvature radius r1 is infinite and the curvature radius r2 is negative, so as to have a shape of a plano convex lens directing a flat surface to the object side near the optical axis X. Alternatively, the first lens L1 also can be formed in a shape, such that both the curvature radius r1 and the curvature radius r2 are negative, so as to have a shape of a meniscus lens directing a concave surface to the object side near the optical axis X.

The second lens L2 is formed in a shape such that a curvature radius r3 of an object-side surface thereof and a curvature radius r4 of an image plane-side surface thereof are both positive, so as to have a shape of a meniscus lens directing a convex surface thereof to the object side near the optical axis X. The shape of the second lens L2 may not be limited to the one in Numerical Data Example 1. Numerical Data Example 6 is an example, in which the second lens L2 is formed in a shape, such that the curvature radius r3 is negative and the curvature radius r4 is positive, so as to have a shape of a biconcave lens near the optical axis X.

The third lens L3 is formed in a shape such that a curvature radius r5 of an object-side surface thereof is positive and a curvature radius r6 of an image plane-side surface thereof is negative, so as to have a shape of a biconvex lens near the optical axis X. The shape of the third lens L3 is not limited to the one in Numerical Data Example 1. Numerical Data Example 4 is an example, in which the curvature radius r5 and the curvature radius r6 are both positive, so as to have a shape of a meniscus lens directing a convex surface thereof to the object side near the optical axis X. On the other hand, Numerical Data Example 5 is an example, in which the curvature radius r5 and the curvature radius r6 are both negative, so as to have a shape of a meniscus lens directing a concave surface thereof to the object side near the optical axis X.

The fourth lens L4 has positive refractive power. In addition, the fourth lens L4 is formed in a shape such that a curvature radius r7 of an object-side surface thereof and a curvature radius r8 of an image plane-side surface thereof are both negative, so as to have a shape of a meniscus lens directing a concave surface thereof to the object side near the optical axis X. The refractive power of the fourth lens L4 is not limited to positive one. Numerical Data Examples 5 and 6 are examples of a lens configuration, in which the refractive power of the fourth lens L4 is negative. Moreover, the shape of the fourth lens L4 is also not limited to the one in Numerical Data Example 1. The imaging lens of Numerical Data Example 2 is an example, in which the curvature radius r7 is positive and the curvature radius r8 is negative, so as to have a shape of a biconvex lens near the optical axis X. The fourth lens L4 can be also formed in a shape such that the curvature radius r7 and the curvature radius r8 are both infinite near the optical axis X and has refractive power near the lens periphery.

The fifth lens L5 is formed in a shape such that a curvature radius r9 of an object-side surface thereof and a curvature radius r10 of an image plane-side surface thereof are both negative, so as to have a shape of a meniscus lens directing a concave surface thereof to the object side near the optical axis X. The shape of the fifth lens L5 is not limited to the one in Numerical Data Example 1. Numerical Data Examples 3 and 4 are examples, in which the curvature radius r9 is negative and the curvature radius r10 is positive, so as to have a shape of a biconcave lens near the optical axis X.

The sixth lens L6 is formed in a shape such that a curvature radius r11 of an object-side surface thereof and a curvature radius r12 of an image plane-side surface thereof are both negative, so as to have a shape of a meniscus lens directing a concave surface thereof to the object side near the optical axis X. The object-side surface of the sixth lens L6 is formed as an aspheric shape having an inflexion point. On the other hand, the image plane-side surface of the sixth lens L6 is formed as an aspheric shape not having an inflexion point. In addition, the image plane-side surface of the sixth lens L6 is formed as an aspheric shape, such that an absolute value of the curvature monotonously increases as the distance from the optical axis X in a direction perpendicular to the optical axis X is longer. With such shape of the sixth lens L6, it is achievable to satisfactorily correct the off-axis chromatic aberration of magnification as well as the axial chromatic aberration. In addition, it is also achievable to suitably restrain an incident angle of a light beam emitted from the imaging lens to the image plane IM within the range of CRA.

According to the embodiment, the imaging lens satisfies the following conditional expressions (1) to (15):

$$f1 < |f2| \tag{1}$$

$$0.02 < D45/f < 0.5 \tag{2}$$

$$0.03 < D45/f < 0.5 \tag{2A}$$

$$0.05 < D45/f < 0.5 \tag{2B}$$

$$3 < |R6r/R6f| < 150 \tag{3}$$

$$-80 < R6r/f < -5 \tag{4}$$

$$-1.0 < f1/f2 < -0.1 \tag{5}$$

$$-2.0 < f2/f < -0.5 \tag{6}$$

$$1 < f3/f < 5 \tag{7}$$

$$-2.0 < f56/f < -0.1 \tag{8}$$

$$-3.0 < f6/f < -0.5 \tag{9}$$

$$0.01 < D23/f < 0.5 \tag{10}$$

$$1.5 < \Phi6/\Phi3 < 3 \tag{11}$$

$$1.2 < La/Hmax < 1.8 \tag{12}$$

$$35 < vd1 < 75 \tag{13}$$

$$15 < vd2 < 35 \tag{14}$$

$$35 < vd3 < 75 \tag{15}$$

In the above conditional expressions:
f: Focal length of a whole lens system
f1: Focal length of the first lens L1
f2: Focal length of the second lens L2
f3: Focal length of the third lens L3
f6: Focal length of the sixth lens L6
f56: Composite focal length of the fifth lens L5 and the sixth lens L6
R6f: Curvature radius of an object-side surface of a sixth lens L6 (=r11)
R6r: Curvature radius of an image plane-side surface of the sixth lens L6 (=r12)
D23: Distance along the optical axis X between the second lens L2 and the third lens L3
D45: Distance along the optical axis X between the fourth lens L4 and the fifth lens L5
Φ3: Effective diameter of an image plane-side surface of the third lens L3
Φ6: Effective diameter of an image plane-side surface of the sixth lens L6
La: Distance on the optical axis X from the object-side surface of the first lens L1 to the image plane IM (air conversion length for the filter 10)
Hmax: Maximum image height of the image plane IM
vd1: Abbe's number of the first lens L1
vd2: Abbe's number of the second lens L2
vd3: Abbe's number of the third lens L3

When the fourth lens L4 has a positive refractive power, the imaging lens of the invention further satisfies the following conditional expressions (16) through (18):

$$0.5 < f4/f < 5.0 \tag{16}$$

$$0.5 < f3/f4 < 4.5 \tag{17}$$

$$2 < f45/f < 8 \tag{18}$$

In the above conditional expressions:
f4: Focal length of the fourth lens L4
f45: Composite focal length of the fourth lens L4 and the fifth lens L5

Here, it is not necessary to satisfy all of the conditional expressions, and it is achievable to obtain an effect corresponding to the respective conditional expression when any single one of the conditional expressions is individually satisfied.

In the embodiment, all lens surfaces are formed as an aspheric surface. The aspheric shapes of the lens surfaces are expressed by the following formula:

$$Z = \frac{C \cdot H^2}{1 + \sqrt{1 - (1+k) \cdot C^2 \cdot H^2}} + \sum (An \cdot H^n) \qquad \text{[Formula 1]}$$

In the above formula:
Z: Distance in a direction of the optical axis
H: Distance from the optical axis in a direction perpendicular to the optical axis
C: Paraxial curvature (=1/r, r: paraxial curvature radius)
k: Conic constant
An: The nth order aspheric coefficient Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index, and vd represents an Abbe's number, respectively. Here, aspheric surfaces are indicated with surface numbers i affixed with * (asterisk). According to the embodiment, in the imaging lens, there is provided an aperture stop ST on an object-side surface of the first lens L1. The position of the aperture stop ST is not limited to the one described in Numerical Data Example 1. For example, the aperture stop ST may be disposed between the third lens L3 and the fourth lens L4.

Numerical Data Example 1

Basic Lens Data

TABLE 1

$f = 4.95$ mm Fno = 2.1 ω = 38.2°

| | i | r | d | nd | vd | [mm] |
|---|---|---|---|---|---|---|
| | | ∞ | ∞ | | | |
| L1 | 1* (ST) | 1.822 | 0.672 | 1.5348 | 55.7 | f1 = 3.432 |
| | 2* | 215.129 | 0.036 | | | |
| L2 | 3* | 4.427 | 0.197 | 1.6422 | 22.4 | f2 = −6.430 |
| | 4* | 2.099 | 0.466 | (=D23) | | |
| L3 | 5* | 20.642 | 0.637 | 1.5348 | 55.7 | f3 = 11.366 |
| | 6* | −8.523 | 0.245 | | | |
| L4 | 7* | −3.102 | 0.477 | 1.5348 | 55.7 | f4 = 7.089 |
| | 8* | −1.797 | 0.497 | (=D45) | | |
| L5 | 9* | −5.545 | 0.632 | 1.6142 | 25.6 | f5 = −10.207 |
| | 10* | −50.095 | 0.304 | | | |
| L6 | 11* | −2.626 | 0.600 | 1.5348 | 55.7 | f6 = −5.204 |
| | 12* | −50.199 | 0.100 | | | |
| | 13 | ∞ | 0.210 | 1.5168 | 64.2 | |
| | 14 | ∞ | 0.579 | | | |
| (IM) | | ∞ | | | | |

Hmax=3.894 mm
La=5.580 mm
f45=22.706 mm
f56=−3.292 mm
Φ3=2.47 mm
Φ6=6.00 mm

TABLE 2

Aspherical surface data

| i | k | A4 | A6 | A8 | A10 | A12 | A14 | A16 |
|---|---|---|---|---|---|---|---|---|
| 1 | 0 | −5.968E−04 | 9.385E−03 | −7.040E−03 | 3.997E−03 | −2.454E−03 | 1.713E−03 | 1.041E−04 |
| 2 | 0 | −4.982E−02 | 2.174E−01 | −3.659E−01 | 3.902E−01 | −2.633E−01 | 1.083E−01 | −2.095E−02 |
| 3 | 0 | −1.471E−01 | 3.346E−01 | −4.447E−01 | 3.714E−01 | −1.633E−01 | 2.777E−02 | −2.182E−03 |
| 4 | 0 | −1.017E−01 | 1.539E−01 | −1.045E−01 | 2.251E−02 | 6.478E−02 | −5.225E−02 | 9.219E−03 |
| 5 | 0 | −5.026E−02 | −6.455E−03 | −2.755E−02 | 5.015E−02 | −4.373E−02 | 2.499E−02 | −4.950E−03 |
| 6 | 0 | −8.405E−02 | −1.203E−03 | −5.107E−02 | −3.497E−03 | 6.650E−02 | −4.482E−02 | 8.496E−03 |
| 7 | 0 | −4.505E−02 | 1.084E−01 | −1.707E−01 | 1.235E−01 | −3.303E−02 | −6.195E−04 | 2.504E−04 |
| 8 | 0 | 3.144E−02 | 8.787E−02 | −4.221E−02 | 1.442E−02 | −4.726E−03 | 7.987E−04 | 5.678E−06 |
| 9 | 0 | −1.001E−01 | 1.029E−01 | −5.582E−02 | 1.174E−02 | 4.091E−04 | −8.976E−04 | 1.675E−04 |
| 10 | 0 | −1.408E−01 | 8.693E−02 | −2.650E−02 | 2.669E−03 | 4.044E−04 | −1.205E−04 | 8.286E−06 |
| 11 | 0 | −6.456E−02 | 3.882E−02 | −7.518E−03 | 7.360E−04 | −1.123E−05 | −6.447E−06 | 6.216E−07 |
| 12 | 0 | 3.172E−03 | −4.995E−03 | 7.965E−04 | −3.215E−05 | −3.387E−06 | 3.331E−07 | −8.286E−09 |

Figure 2:
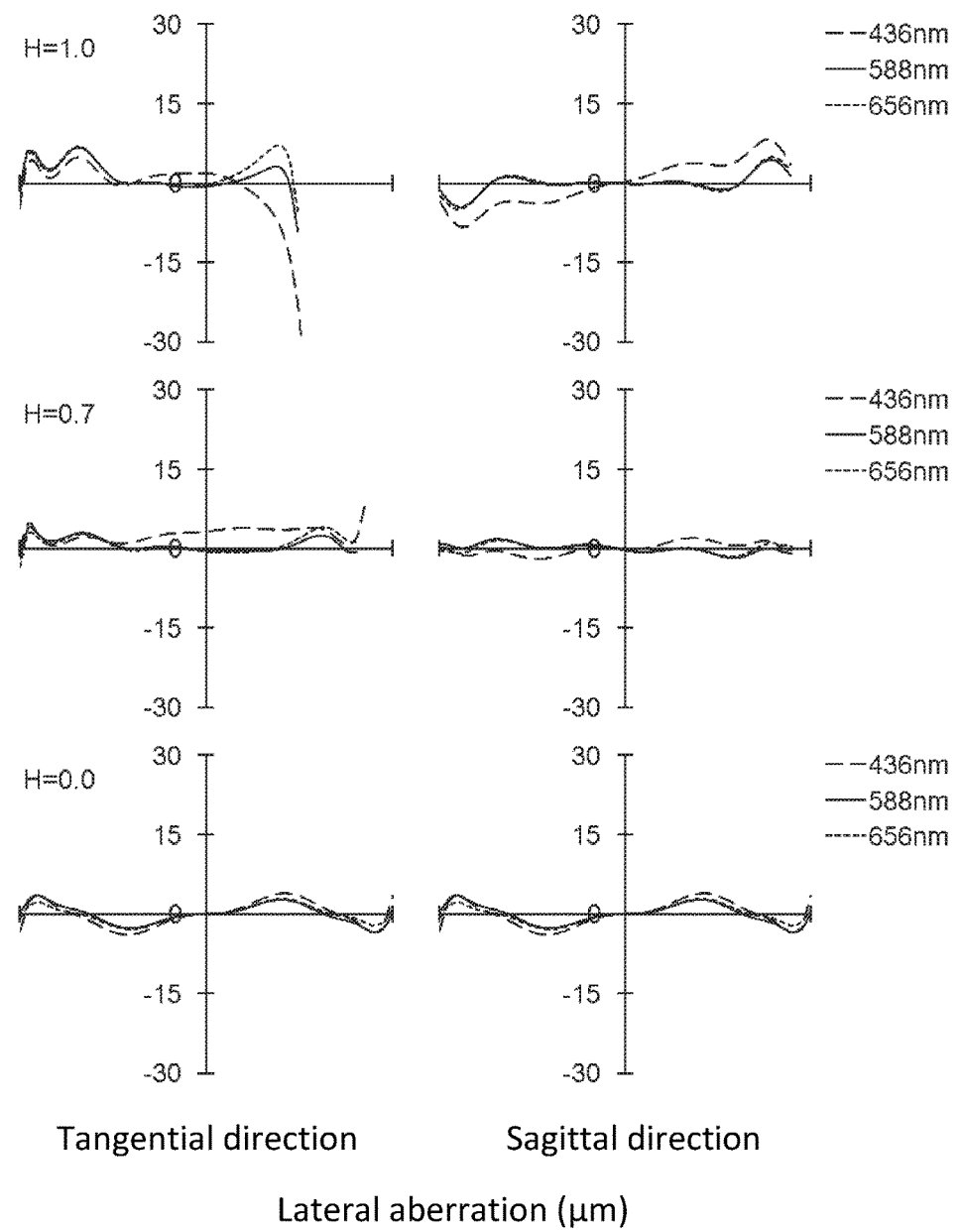
FIG. 2 is an aberration diagram showing a lateral aberration of the imaging lens of FIG. 1.
Figure 3:
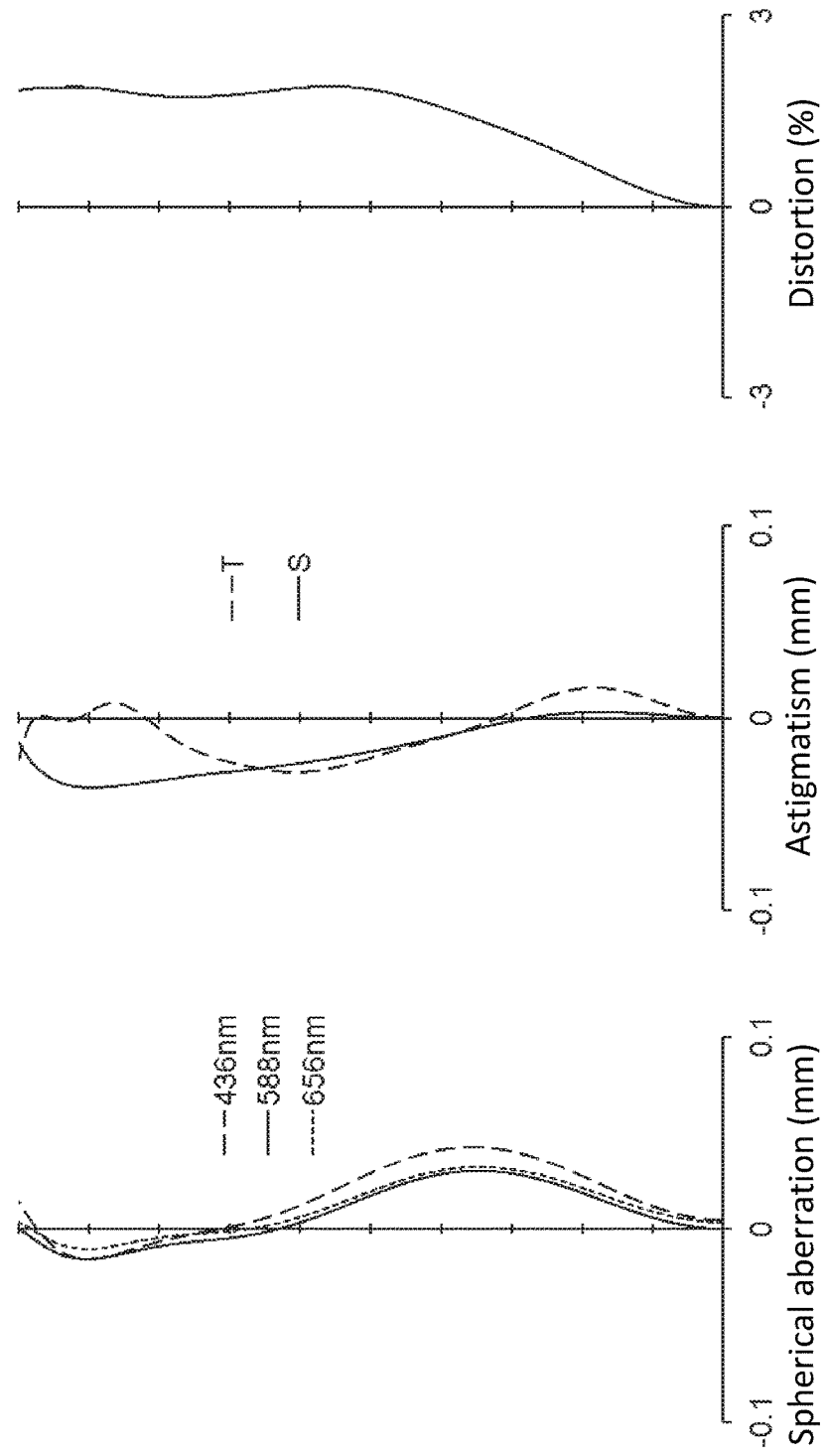
FIG. 3 is an aberration diagram showing a spherical aberration, astigmatism, and a distortion of the imaging lens of FIG. 1.
Figure 4:
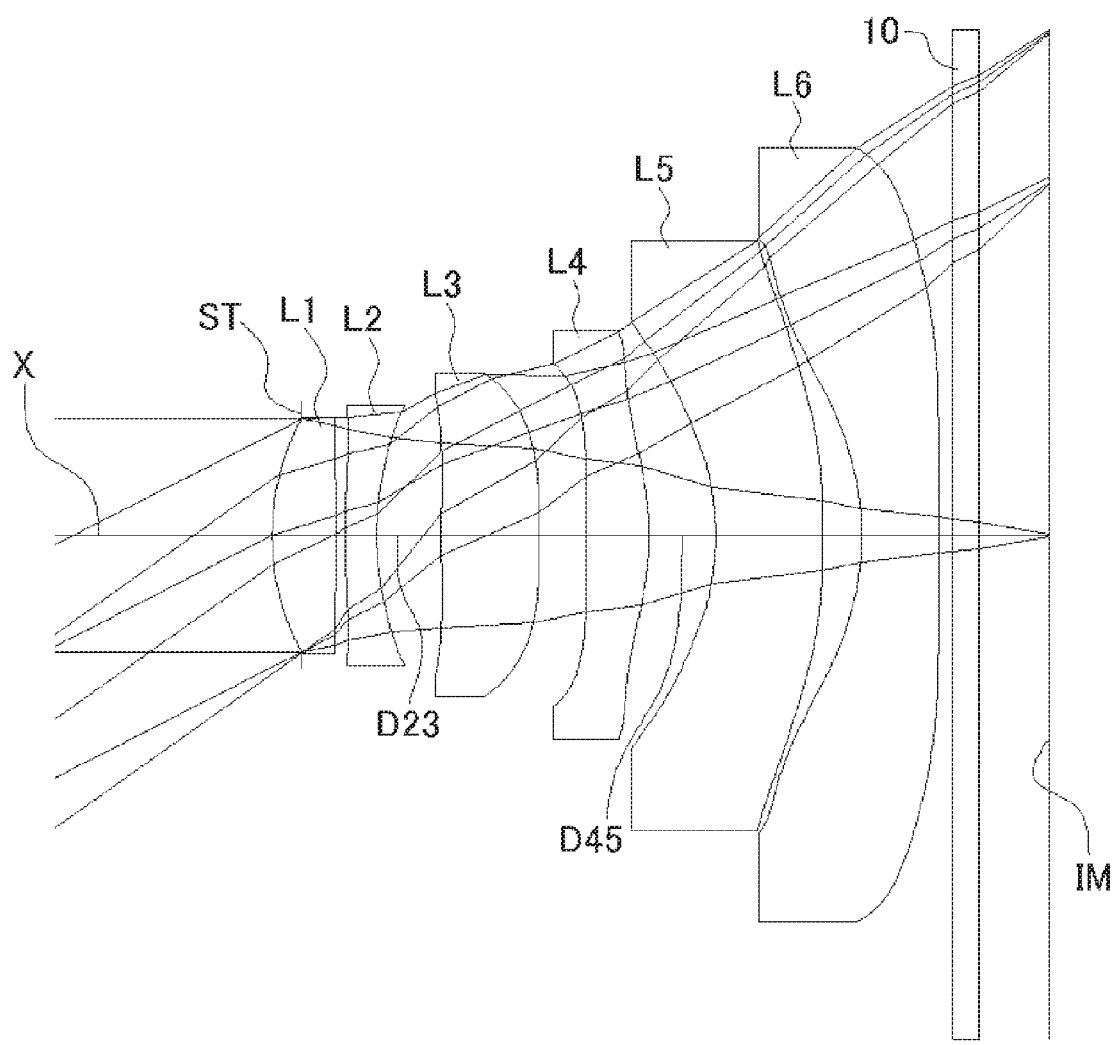
FIG. 4 shows a sectional view of a schematic configuration of an imaging lens in Numerical Data Example 2.

The values of the respective conditional expressions are as follows:

$D45/f=0.10$ $|R6r/R6f|=19.12$ $R6r/f=-10.13$ $f1/f2=-0.53$ $f2/f=-1.30$ $f3/f=2.29$ $f56/f=-0.66$ $f6/f=-1.05$ $D23/f=0.09$ $Φ6/Φ3=2.43$ $La/H\max=1.43$ $f4/f=1.43$ $f3/f4=1.60$ $f45/f=4.58$ Accordingly, the imaging lens of Numerical Data Example 1 satisfies the above-described conditional expressions. FIG. 2 shows a lateral aberration that corresponds to a ratio H of each image height to the maximum image height Hmax (hereinafter referred to as "image height ratio H"), which is divided into a tangential direction and a sagittal direction (The same is true for FIGS. 5, 8, 11, 14, and 17). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, 15, and 18). As shown in FIGS. 2 and 3, according to the imaging lens of Numerical Data Example 1, the aberrations are satisfactorily corrected.

Numerical Data Example 2

Basic Lens Data

TABLE 3

$f = 5.45$ mm Fno = 3.0 ω = 35.5°

| | i | r | d | nd | vd | [mm] |
|---|---|---|---|---|---|---|
| | | ∞ | ∞ | | | |
| L1 | 1* (ST) | 1.966 | 0.490 | 1.5348 | 55.7 | f1 = 3.591 |
| | 2* | −76.673 | 0.072 | | | |
| L2 | 3* | 5.554 | 0.245 | 1.6422 | 22.4 | f2 = −5.779 |
| | 4* | 2.186 | 0.499 | (=D23) | | |
| L3 | 5* | 19.784 | 0.757 | 1.5348 | 55.7 | f3 = 15.074 |
| | 6* | −13.425 | 0.362 | | | |

TABLE 3-continued

| | | f = 5.45 mm Fno = 3.0 ω = 35.5° | | | | |
|---|---|---|---|---|---|---|
| | i | r | d | nd | νd | [mm] |
| L4 | 7* | 57.999 | 0.485 | 1.5348 | 55.7 | f4 = 4.307 |
| | 8* | −2.392 | 0.515 | (=D45) | | |
| L5 | 9* | −2.228 | 0.824 | 1.5348 | 55.7 | f5 = −4.791 |
| | 10* | −19.290 | 0.303 | | | |
| L6 | 11* | −2.501 | 0.600 | 1.5348 | 55.7 | f6 = −4.922 |
| | 12* | −54.473 | 0.100 | | | |
| | 13 | ∞ | 0.210 | 1.5168 | 64.2 | |
| | 14 | ∞ | 0.541 | | | |
| (IM) | | ∞ | | | | |

Hmax=3.894 mm

La=5.931 mm f45=21.942 mm f56=−2.222 mm

Φ3=2.50 mm

Φ6=5.99 mm

TABLE 4

Aspherical surface data

| i | k | A4 | A6 | A8 | A10 | A12 | A14 | A16 |
|---|---|---|---|---|---|---|---|---|
| 1 | 0 | 6.809E−03 | 6.934E−03 | 8.236E−04 | 1.166E−02 | −9.922E−04 | −1.321E−04 | −8.559E−03 |
| 2 | 0 | −5.732E−02 | 2.081E−01 | −3.609E−01 | 3.959E−01 | −2.685E−01 | 9.526E−02 | −3.876E−02 |
| 3 | 0 | −1.603E−01 | 3.151E−01 | −4.628E−01 | 3.684E−01 | −1.572E−01 | 2.713E−02 | −3.508E−02 |
| 4 | 0 | −1.047E−01 | 1.495E−01 | −1.112E−01 | 1.755E−02 | 6.154E−02 | −5.294E−02 | 1.079E−02 |
| 5 | 0 | −4.861E−02 | −8.192E−04 | −2.736E−02 | 4.827E−02 | −4.508E−02 | 2.459E−02 | −4.701E−03 |
| 6 | 0 | −1.254E−01 | 1.722E−02 | −5.150E−02 | −7.986E−03 | 6.464E−02 | −4.465E−02 | 9.382E−03 |
| 7 | 0 | −7.612E−02 | 1.089E−01 | −1.806E−01 | 1.191E−01 | −3.306E−02 | −9.963E−05 | 8.961E−04 |
| 8 | 0 | 2.051E−02 | 7.945E−02 | −4.369E−02 | 1.408E−02 | −4.783E−03 | 7.967E−04 | 7.706E−06 |
| 9 | 0 | −7.660E−02 | 1.093E−01 | −5.506E−02 | 1.191E−02 | 4.317E−04 | −8.955E−04 | 1.681E−04 |
| 10 | 0 | −1.362E−01 | 8.733E−02 | −2.609E−02 | 2.700E−03 | 4.029E−04 | −1.214E−04 | 8.175E−06 |
| 11 | 0 | −5.338E−02 | 3.911E−02 | −7.816E−03 | 7.540E−04 | −3.865E−06 | −5.268E−06 | 2.073E−07 |
| 12 | 0 | 4.832E−03 | −5.184E−03 | 8.132E−04 | −2.510E−05 | −3.442E−06 | 2.691E−07 | −1.127E−08 |

The values of the respective conditional expressions are as follows:

$D45/f$=0.09

$|R6r/R6f|$=21.78

$R6r/f$=−9.99

$f1/f2$=−0.62

$f2/f$=−1.06

$f3/f$=2.77

$f56/f$=−0.41

$f6/f$=−0.90

$D23/f$=0.09

$Φ6/Φ3$=2.40

$La/H\max$=1.52

$f4/f$=0.79

$f3/f4$=3.50

$f45/f$=4.03

Accordingly, the imaging lens of Numerical Data Example 2 satisfies the above-described conditional expressions.

Figure 5:
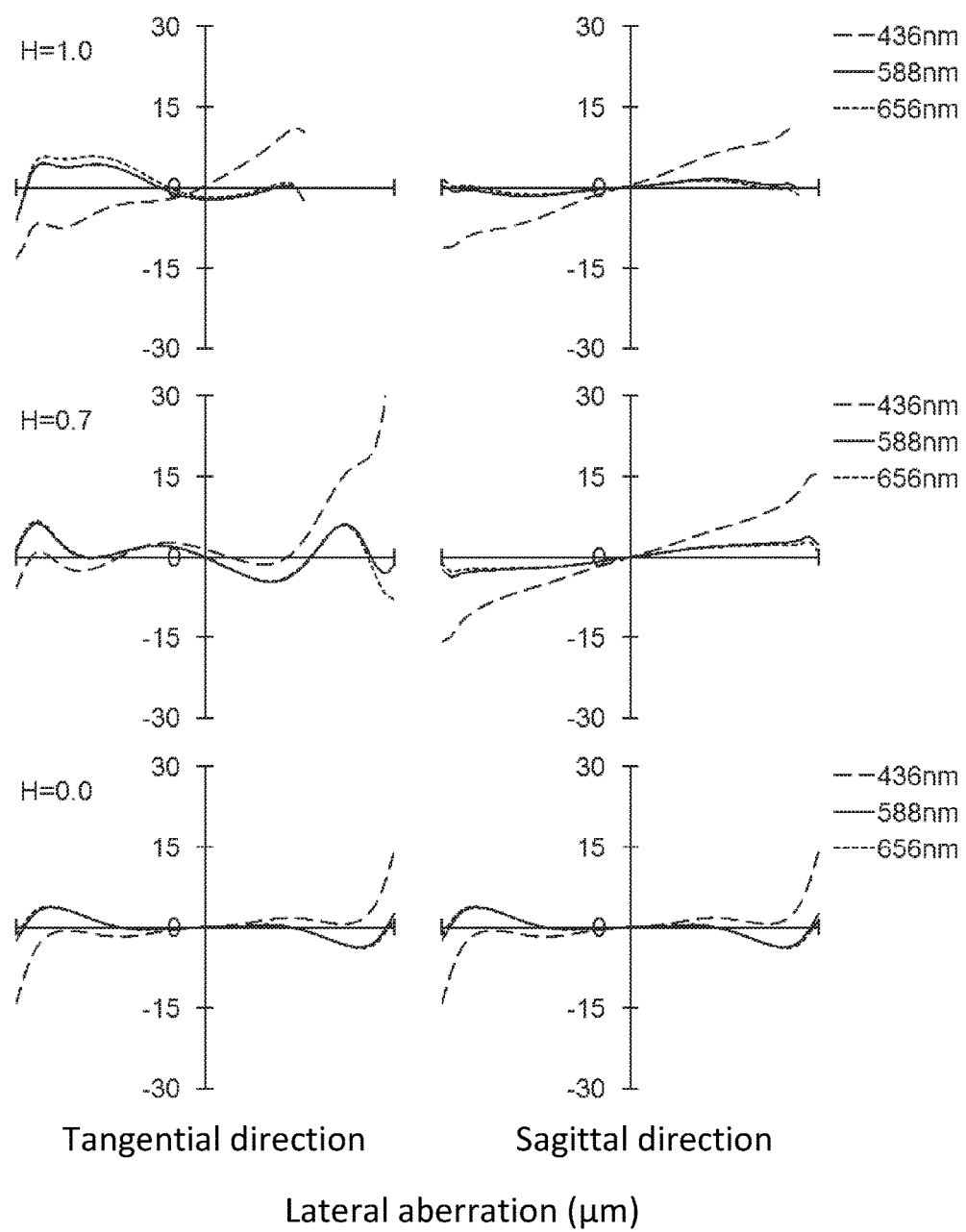
FIG. 5 is an aberration diagram showing a lateral aberration of the imaging lens of FIG. 4.
Figure 6:
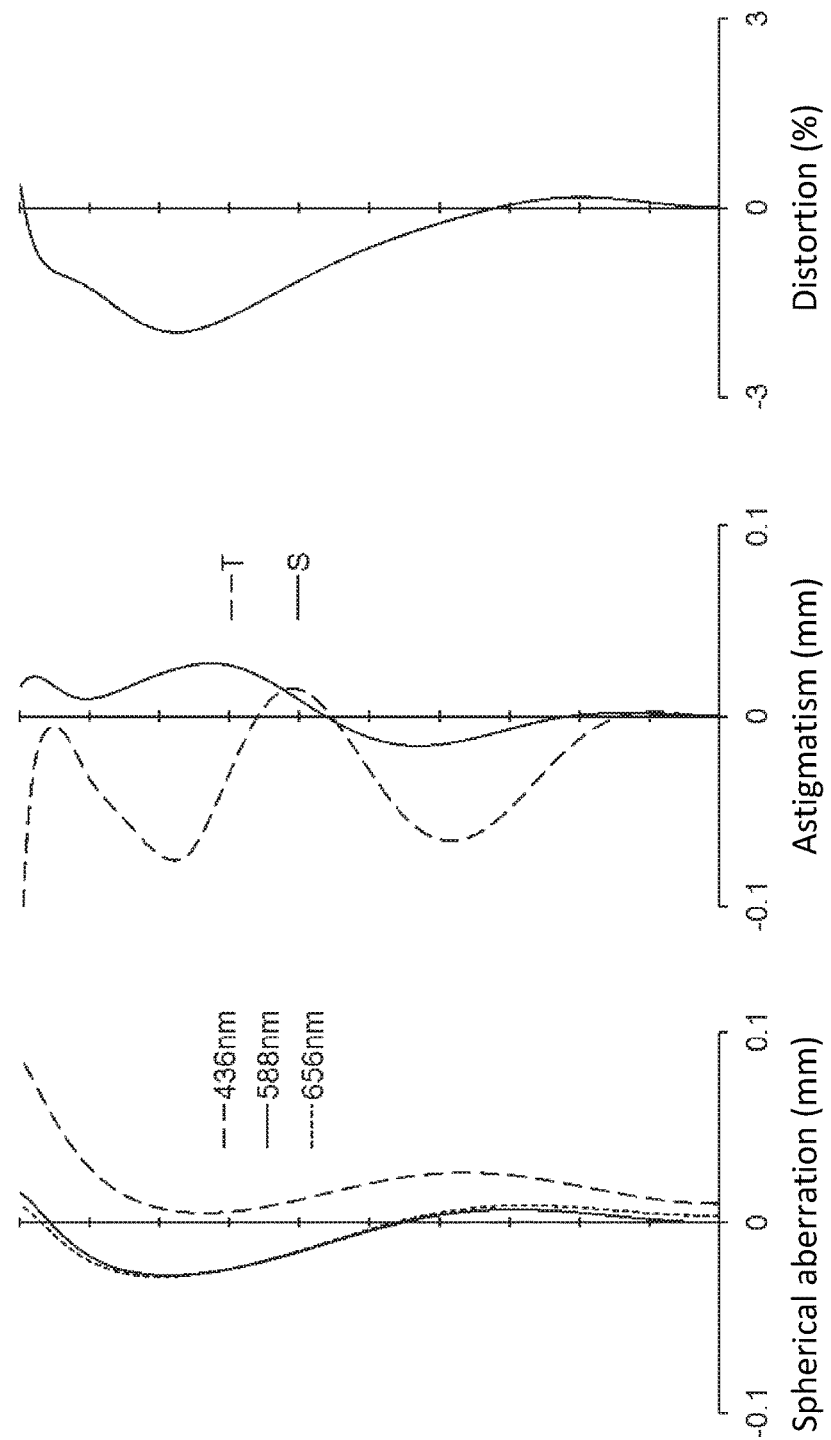
FIG. 6 is an aberration diagram showing a spherical aberration, astigmatism, and a distortion of the imaging lens of FIG. 4.
Figure 7:
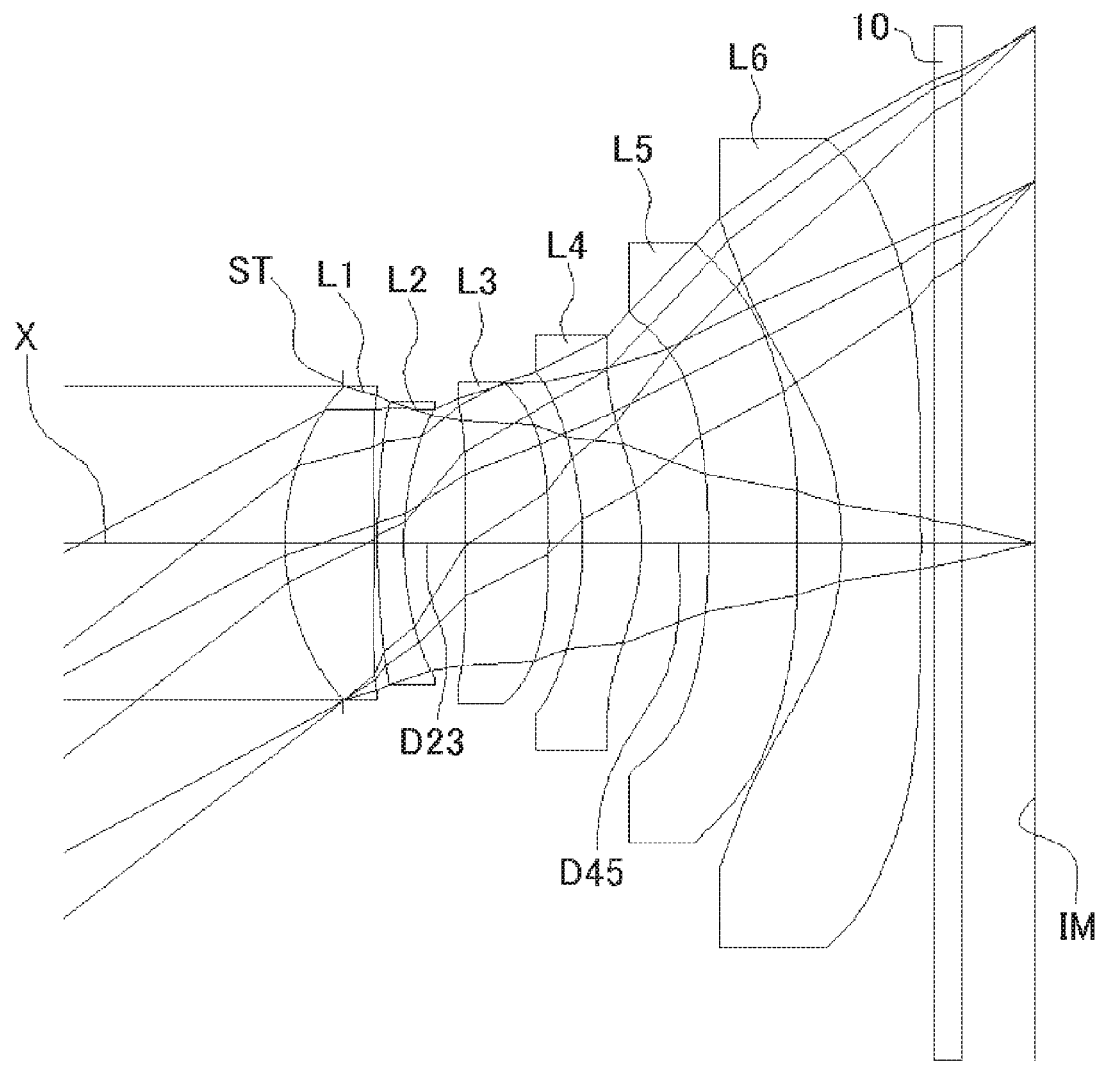
FIG. 7 shows a sectional view of a schematic configuration of an imaging lens in Numerical Data Example 3.

FIG. 5 shows a lateral aberration that corresponds to the image height ratio H, and FIG. 6 shows a spherical aberration (mm), astigmatism (mm), and a distortion (%), respectively. As shown in FIGS. 5 and 6, according to the imaging lens of Numerical Data Example 2, the aberrations are also satisfactorily corrected.

Numerical Data Example 3

Basic Lens Data

TABLE 5

| | | f = 4.93 mm Fno = 2.1 ω = 38.3° | | | | |
|---|---|---|---|---|---|---|
| | i | r | d | nd | νd | [mm] |
| | | ∞ | ∞ | | | |
| L1 | 1* (ST) | 1.848 | 0.671 | 1.5348 | 55.7 | f1 = 3.376 |
| | 2* | −68.173 | 0.026 | | | |

TABLE 5-continued

| | | f = 4.93 mm Fno = 2.1 ω = 38.3° | | | | |
|---|---|---|---|---|---|---|
| | i | r | d | nd | νd | [mm] |
| L2 | 3* | 5.005 | 0.197 | 1.6422 | 22.4 | f2 = −6.318 |
| | 4* | 2.206 | 0.460 | (=D23) | | |
| L3 | 5* | 22.302 | 0.630 | 1.5348 | 55.7 | f3 = 11.630 |
| | 6* | −8.541 | 0.257 | | | |
| L4 | 7* | −2.870 | 0.443 | 1.5348 | 55.7 | f4 = 8.307 |
| | 8* | −1.837 | 0.504 | (=D45) | | |
| L5 | 9* | −9.145 | 0.666 | 1.6142 | 25.6 | f5 = −12.678 |
| | 10* | 53.875 | 0.337 | | | |
| L6 | 11* | −2.629 | 0.600 | 1.5348 | 55.7 | f6 = −5.217 |
| | 12* | −49.259 | 0.100 | | | |
| | 13 | ∞ | 0.210 | 1.5168 | 64.2 | |
| | 14 | ∞ | 0.549 | | | |
| (IM) | | ∞ | | | | |

Hmax=3.894 mm

La=5.578 mm f45=23.465 mm f56=−3.563 mm

Φ3=2.43 mm

Φ6=6.09 mm

TABLE 6

Aspherical surface data

| i | k | A4 | A6 | A8 | A10 | A12 | A14 | A16 |
|---|---|---|---|---|---|---|---|---|
| 1 | 0 | 3.396E−04 | 8.050E−03 | −6.936E−03 | 4.200E−03 | −2.435E−03 | 1.639E−03 | −5.211E−06 |
| 2 | 0 | −4.838E−02 | 2.167E−01 | −3.661E−01 | 3.900E−01 | −2.635E−01 | 1.082E−01 | −2.084E−02 |
| 3 | 0 | −1.481E−01 | 3.349E−01 | −4.449E−01 | 3.714E−01 | −1.630E−01 | 2.812E−02 | −1.925E−03 |
| 4 | 0 | −1.027E−01 | 1.507E−01 | −1.055E−01 | 2.266E−02 | 6.519E−02 | −5.186E−02 | 9.364E−03 |
| 5 | 0 | −5.072E−02 | −6.816E−03 | −2.708E−02 | 5.051E−02 | −4.362E−02 | 2.477E−02 | −5.400E−03 |
| 6 | 0 | −8.340E−02 | 6.691E−04 | −5.048E−02 | −3.495E−03 | 6.640E−02 | −4.484E−02 | 8.486E−03 |
| 7 | 0 | −3.956E−02 | 1.092E−01 | −1.703E−01 | 1.235E−01 | −3.322E−02 | −7.308E−04 | 2.653E−04 |
| 8 | 0 | 2.952E−02 | 8.734E−02 | −4.234E−02 | 1.440E−02 | −4.729E−03 | 7.978E−04 | 5.553E−06 |
| 9 | 0 | −1.045E−01 | 1.025E−01 | −5.588E−02 | 1.173E−02 | 4.080E−04 | −8.987E−04 | 1.671E−04 |
| 10 | 0 | −1.421E−01 | 8.662E−02 | −2.652E−02 | 2.670E−03 | 4.047E−04 | −1.204E−04 | 8.307E−06 |
| 11 | 0 | −6.433E−02 | 3.887E−02 | −7.524E−03 | 7.355E−04 | −1.131E−05 | −6.455E−06 | 6.216E−07 |
| 12 | 0 | 4.350E−03 | −5.011E−03 | 7.915E−04 | −3.186E−05 | −3.378E−06 | 3.324E−07 | −8.630E−09 |

The values of the respective conditional expressions are as follows:

$D45/f=0.10$ $|R6r/R6f|=18.74$ $R6r/f=-10.00$ $f1/f2=-0.53$ $f2/f=-1.28$ $f3/f=2.36$ $f56/f=-0.72$ $f6/f=-1.06$ $D23/f=0.09$ $\Phi 6/\Phi 3=2.51$ $La/Hmax=1.43$ $f4/f=1.69$ $f3/f4=1.40$ $f45/f=4.76$ Accordingly, the imaging lens of Numerical Data Example 3 satisfies the above-described conditional expressions.

Figure 8:
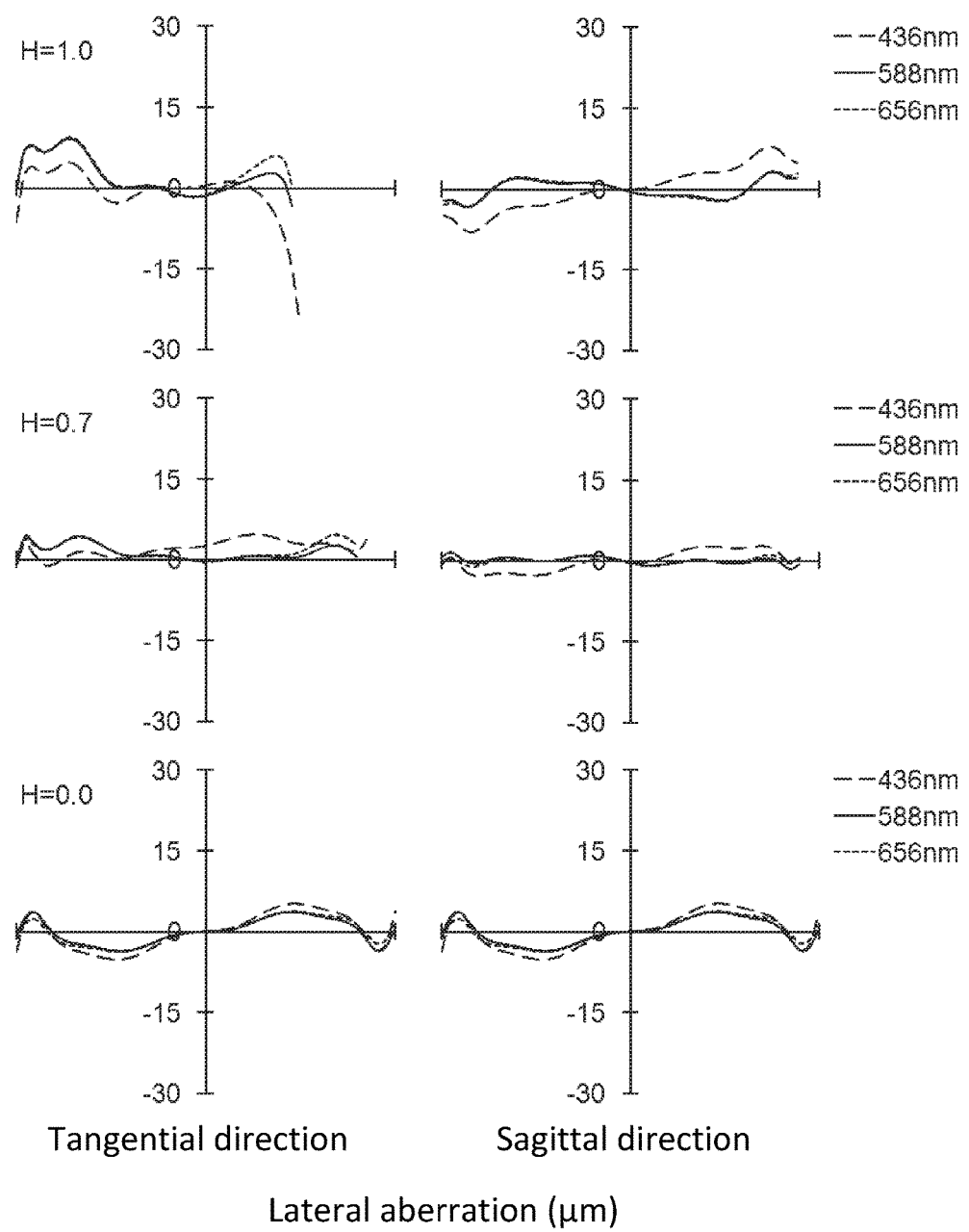
FIG. 8 is an aberration diagram showing a lateral aberration of the imaging lens of FIG. 7.
Figure 9:
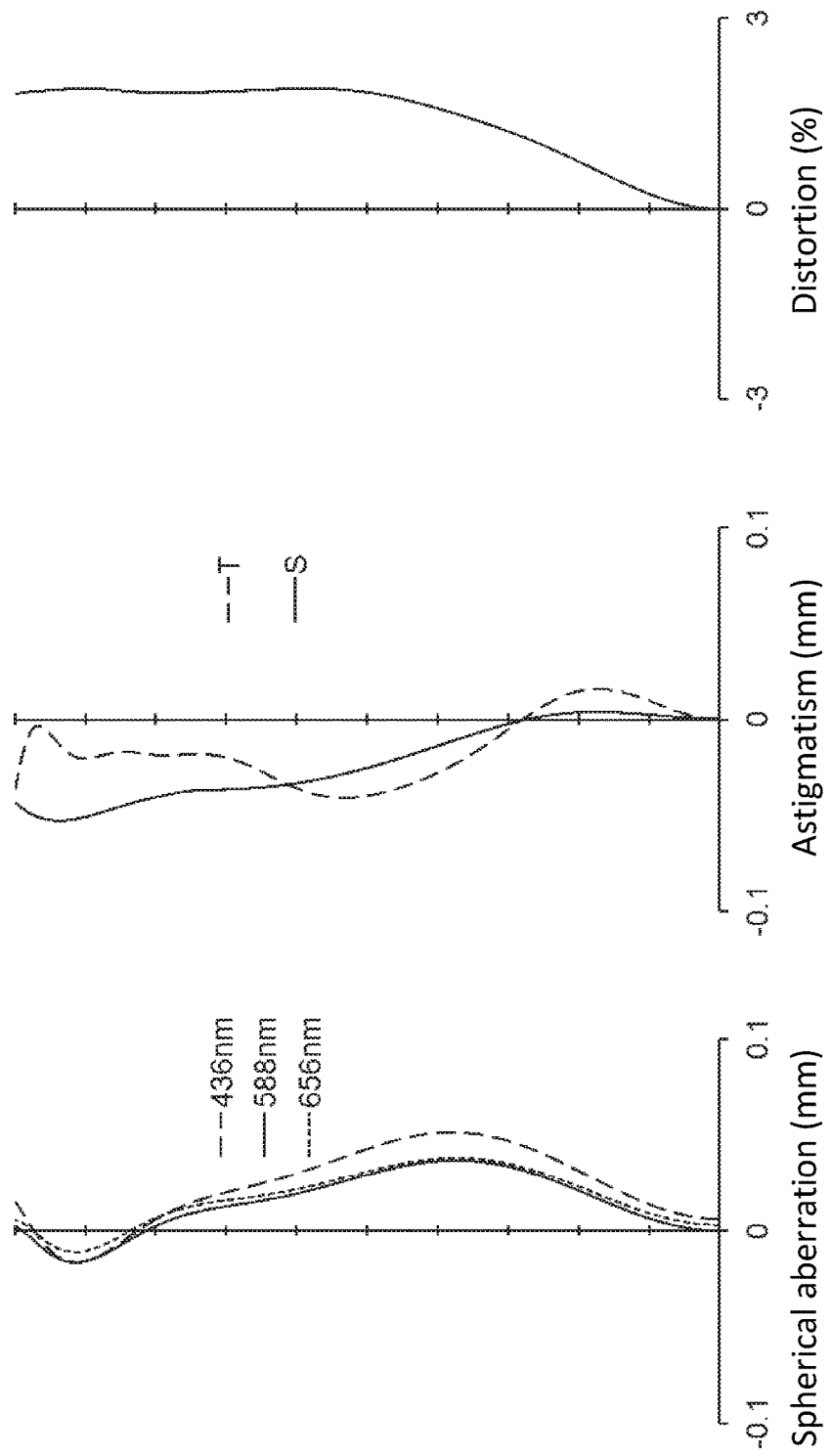
FIG. 9 is an aberration diagram showing a spherical aberration, astigmatism, and a distortion of the imaging lens of FIG. 7.
Figure 10:
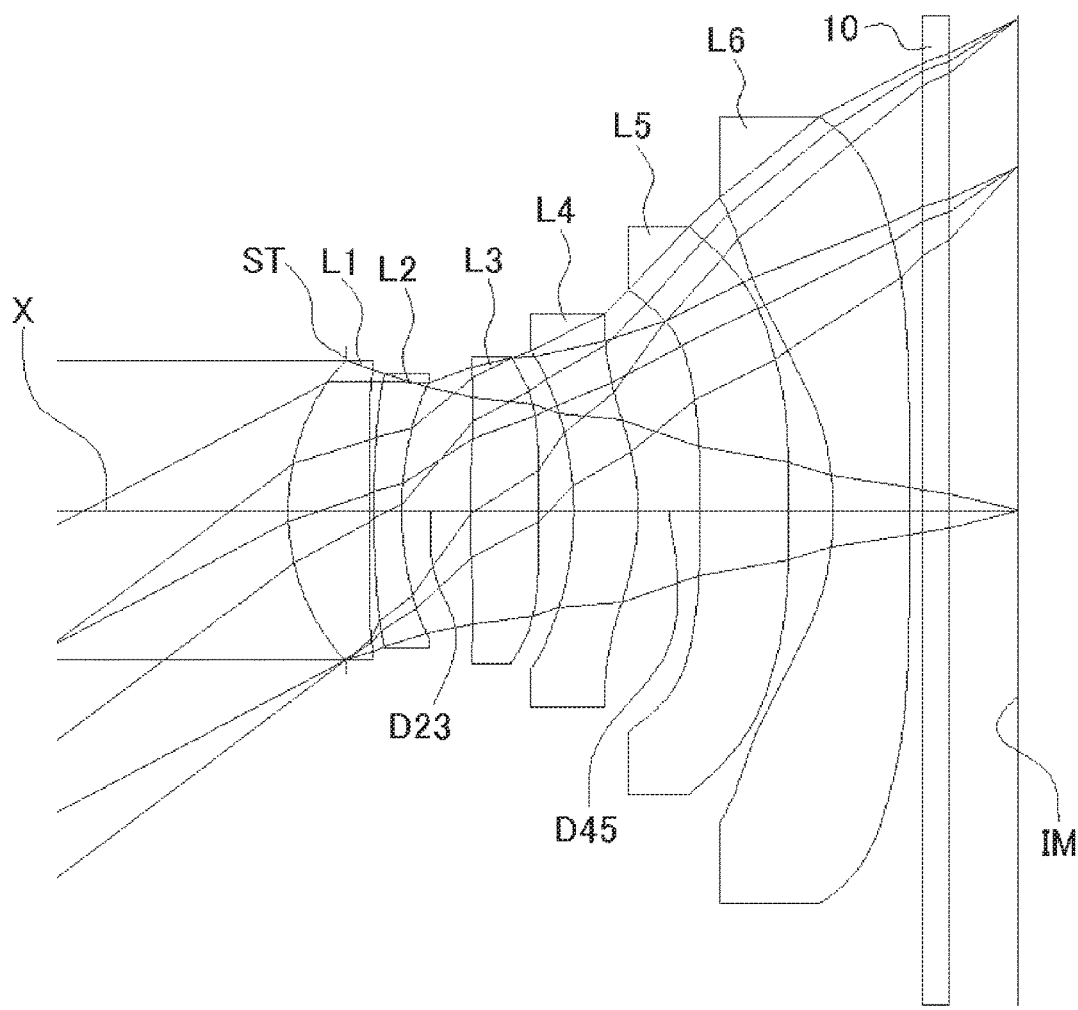
FIG. 10 shows a sectional view of a schematic configuration of an imaging lens in Numerical Data Example 4.

FIG. 8 shows a lateral aberration that corresponds to the image height ratio H, and FIG. 9 shows a spherical aberration (mm), astigmatism (mm), and a distortion (%), respectively. As shown in FIGS. 8 and 9, according to the imaging lens of Numerical Data Example 3, the aberrations are also satisfactorily corrected.

Numerical Data Example 4

Basic Lens Data

TABLE 7

| | | f = 5.08 mm Fno = 2.1 ω = 37.5° | | | | |
|---|---|---|---|---|---|---|
| | i | r | d | nd | νd | [mm] |
| | | ∞ | ∞ | | | |
| L1 | 1* (ST) | 1.839 | 0.640 | 1.5348 | 55.7 | f1 = 3.396 |
| | 2* | −127.657 | 0.033 | | | |
| L2 | 3* | 5.757 | 0.219 | 1.6422 | 22.4 | f2 = −6.108 |
| | 4* | 2.298 | 0.539 (=D23) | | | |
| L3 | 5* | 6.078 | 0.544 | 1.5348 | 55.7 | f3 = 12.282 |
| | 6* | 78.934 | 0.278 | | | |
| L4 | 7* | −2.608 | 0.507 | 1.5348 | 55.7 | f4 = 10.196 |
| | 8* | −1.884 | 0.489 (=D45) | | | |
| L5 | 9* | −42.125 | 0.690 | 1.6142 | 25.6 | f5 = −19.220 |
| | 10* | 16.503 | 0.363 | | | |
| L6 | 11* | −2.662 | 0.600 | 1.5348 | 55.7 | f6 = −5.276 |
| | 12* | −50.760 | 0.100 | | | |
| | 13 | ∞ | 0.210 | 1.5168 | 64.2 | |
| | 14 | ∞ | 0.541 | | | |
| (IM) | | ∞ | | | | |

Hmax=3.894 mm
La=5.681 mm
f45=21.468 mm
f56=−4.063 mm
Φ3=2.43 mm
Φ6=6.22 mm

TABLE 8

Aspherical surface data

| i | k | A4 | A6 | A8 | A10 | A12 | A14 | A16 |
|---|---|---|---|---|---|---|---|---|
| 1 | 0 | 1.400E−03 | 7.938E−03 | −6.804E−03 | 4.267E−03 | −2.469E−03 | 1.567E−03 | −4.231E−06 |
| 2 | 0 | −4.734E−02 | 2.164E−01 | −3.659E−01 | 3.902E−01 | −2.634E−01 | 1.083E−01 | −2.084E−02 |
| 3 | 0 | −1.466E−01 | 3.357E−01 | −4.450E−01 | 3.714E−01 | −1.627E−01 | 2.868E−02 | −1.474E−03 |
| 4 | 0 | −1.038E−01 | 1.509E−01 | −1.062E−01 | 2.181E−02 | 6.445E−02 | −5.173E−02 | 9.879E−03 |
| 5 | 0 | −5.313E−02 | −6.693E−03 | −2.627E−02 | 5.136E−02 | −4.336E−02 | 2.433E−02 | −6.096E−03 |
| 6 | 0 | −8.286E−02 | 2.978E−03 | −4.978E−02 | −3.344E−03 | 6.654E−02 | −4.470E−02 | 8.645E−03 |
| 7 | 0 | −2.631E−02 | 1.073E−01 | −1.701E−01 | 1.234E−01 | −3.316E−02 | −8.321E−04 | 2.029E−04 |
| 8 | 0 | 2.652E−02 | 8.689E−02 | −4.254E−02 | 1.434E−02 | −4.745E−03 | 7.925E−04 | 3.191E−06 |
| 9 | 0 | −1.111E−01 | 1.029E−01 | −5.581E−02 | 1.170E−02 | 3.931E−04 | −9.049E−04 | 1.654E−04 |
| 10 | 0 | −1.459E−01 | 8.618E−02 | −2.650E−02 | 2.677E−03 | 4.052E−04 | −1.205E−04 | 8.277E−06 |

TABLE 8-continued

Aspherical surface data

| i | k | A4 | A6 | A8 | A10 | A12 | A14 | A16 |
|---|---|---|---|---|---|---|---|---|
| 11 | 0 | −6.147E−02 | 3.891E−02 | −7.554E−03 | 7.307E−04 | −1.182E−05 | −6.525E−06 | 6.149E−07 |
| 12 | 0 | 5.838E−03 | −4.954E−03 | 8.023E−04 | −3.274E−05 | −3.526E−06 | 3.254E−07 | −8.081E−09 |

The values of the respective conditional expressions are as follows:

$D45/f = 0.10$ $|R6r/R6f| = 19.07$ $R6r/f = -10.00$ $f1/f2 = -0.56$ $f2/f = -1.20$ $f3/f = 2.42$ $f56/f = -0.80$ $f6/f = -1.04$ $D23/f = 0.11$ $\Phi6/\Phi3 = 2.56$ $La/Hmax = 1.46$ $f4/f = 2.01$ $f3/f4 = 1.21$ $f45/f = 4.23$ Accordingly, the imaging lens of Numerical Data Example 4 satisfies the above-described conditional expressions.

Figure 11:
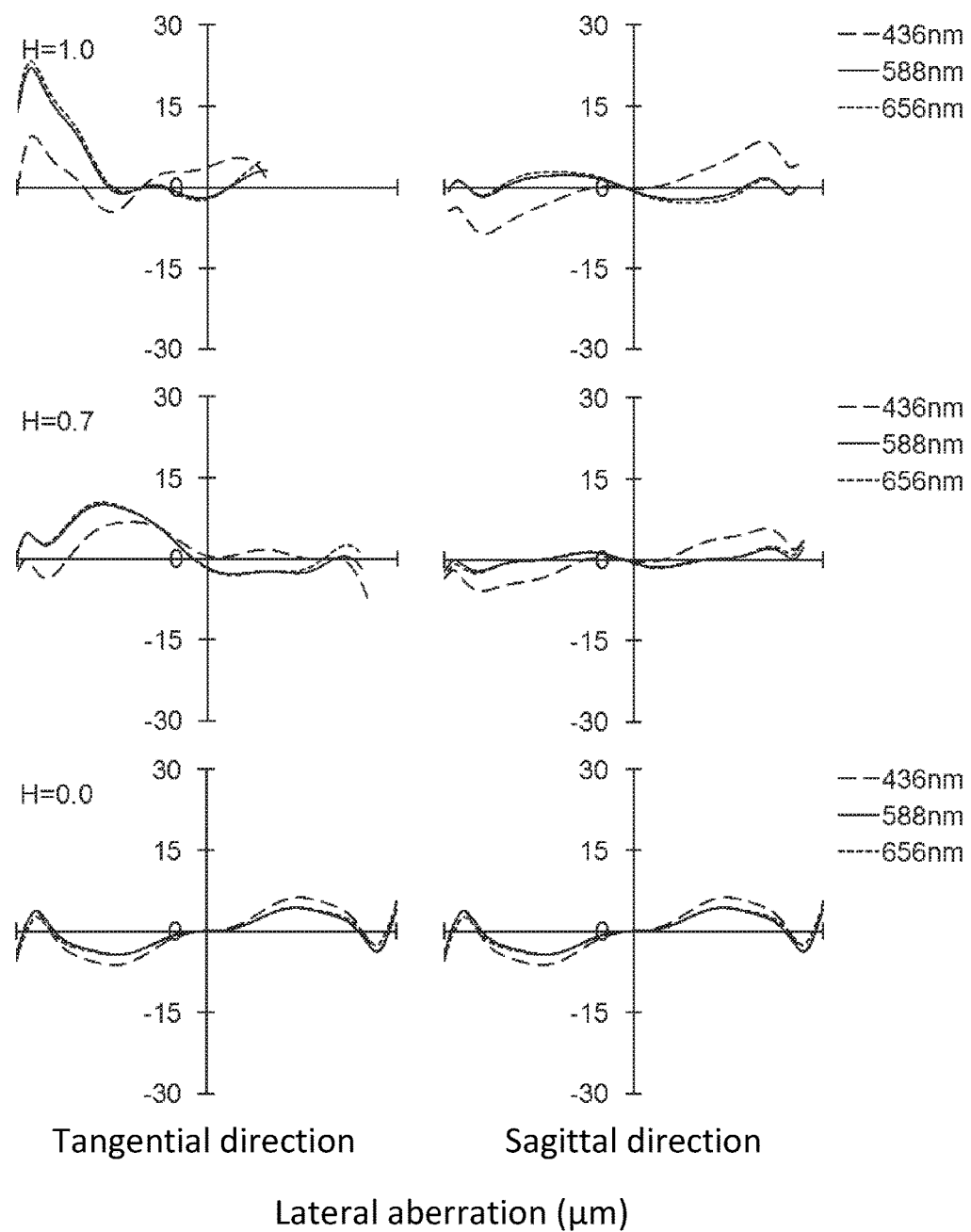
FIG. 11 is an aberration diagram showing a lateral aberration of the imaging lens of FIG. 10.
Figure 12:
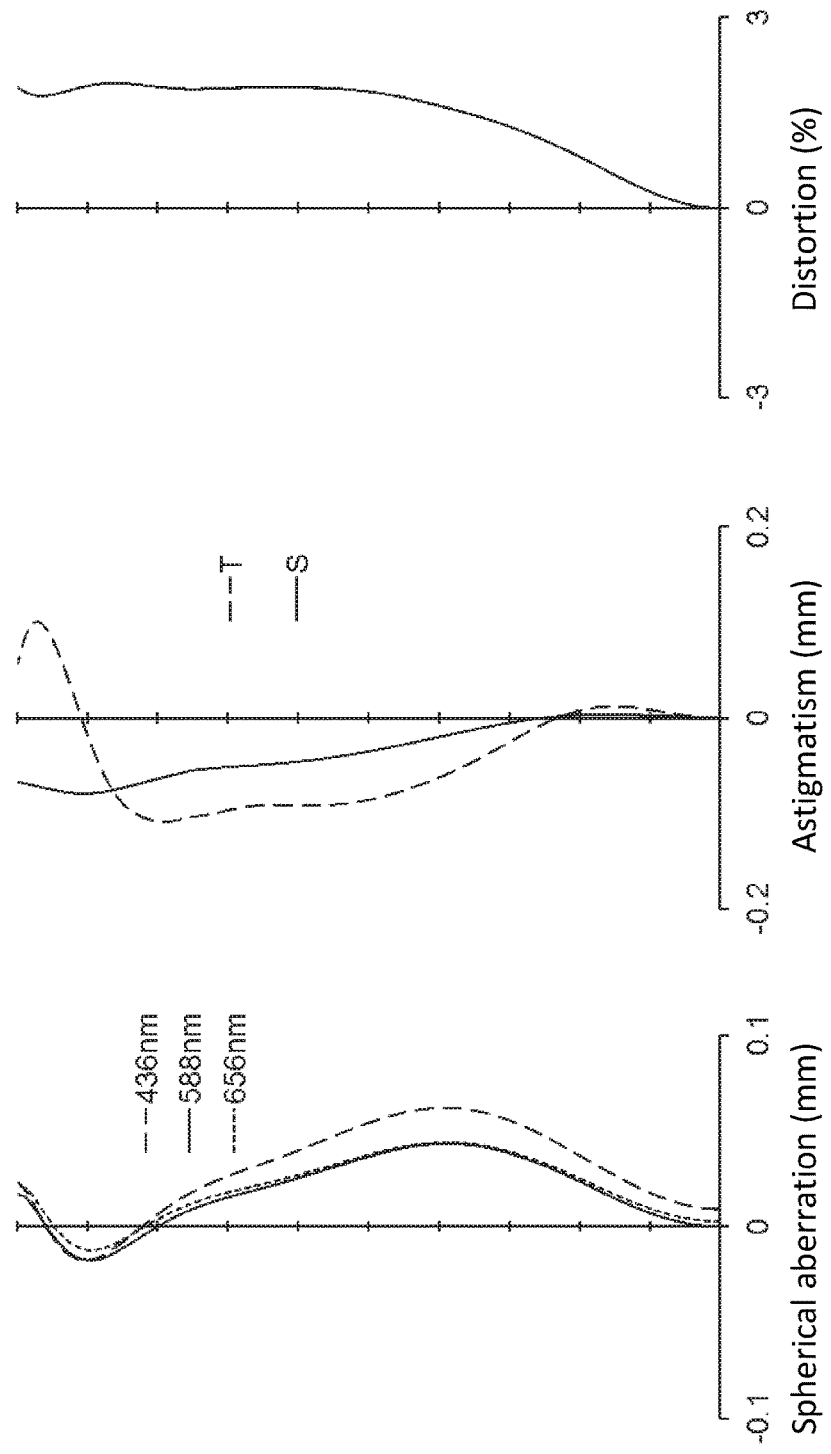
FIG. 12 is an aberration diagram showing a spherical aberration, astigmatism, and a distortion of the imaging lens of FIG. 10.
Figure 13:
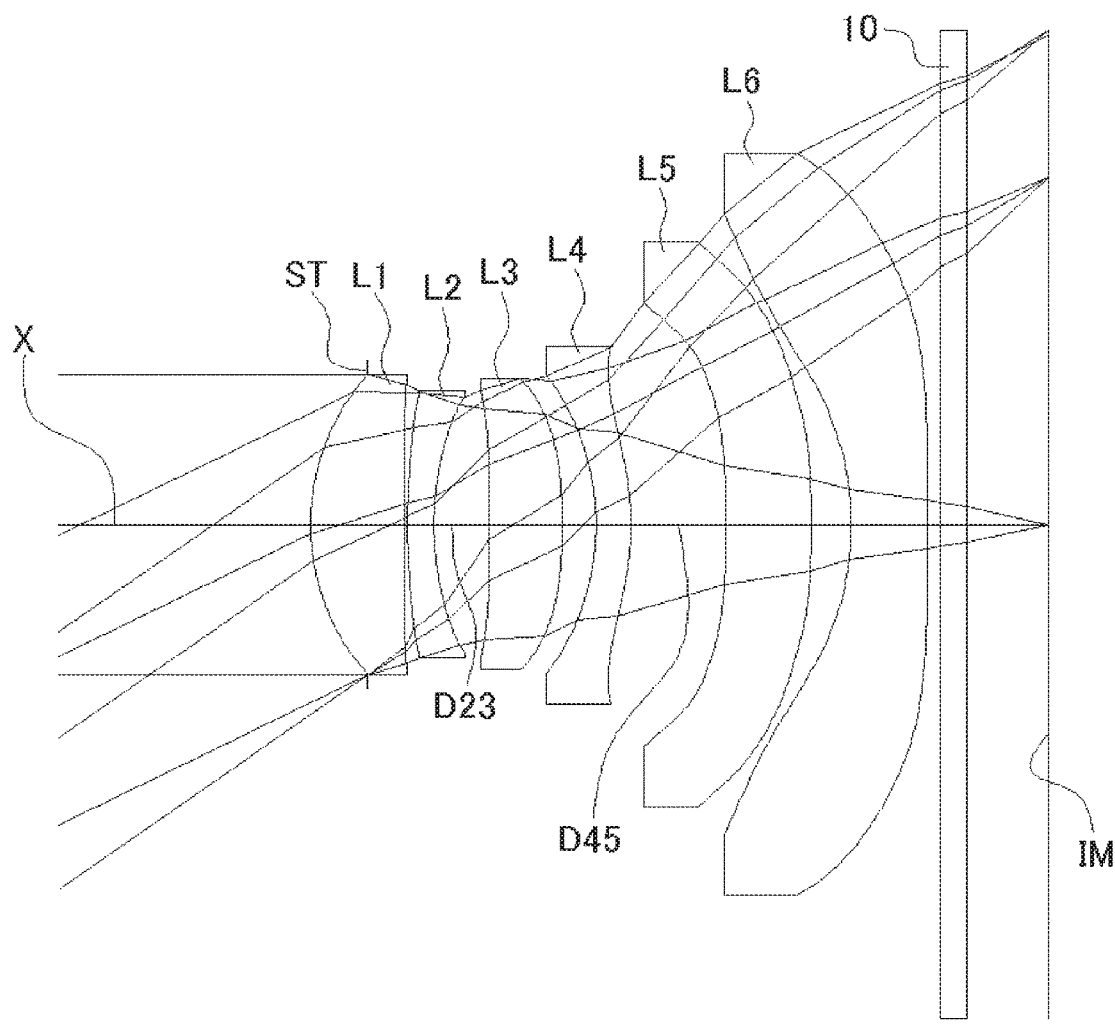
FIG. 13 shows a sectional view of a schematic configuration of an imaging lens in Numerical Data Example 5.

FIG. 11 shows a lateral aberration that corresponds to the image height ratio H, and FIG. 12 shows a spherical aberration (mm), astigmatism (mm), and a distortion (%), respectively. As shown in FIGS. 11 and 12, according to the imaging lens of Numerical Data Example 4, the aberrations are also satisfactorily corrected.

Numerical Data Example 5

Basic Lens Data

TABLE 9 f = 5.52 mm Fno = 2.3 ω = 35.2°

| | i | r | d | nd | vd | [mm] |
|---|---|---|---|---|---|---|
| | | ∞ | ∞ | | | |
| L1 | 1* (ST) | 1.789 | 0.737 | 1.5348 | 55.7 | f1 = 3.319 |
| | 2* | −196.637 | 0.022 | | | |
| L2 | 3* | 4.496 | 0.208 | 1.6422 | 22.4 | f2 = −6.679 |
| | 4* | 2.155 | 0.437 | (=D23) | | |
| L3 | 5* | −37.900 | 0.577 | 1.5348 | 55.7 | f3 = 9.367 |
| | 6* | −4.448 | 0.265 | | | |
| L4 | 7* | −2.063 | 0.274 | 1.5348 | 55.7 | f4 = −58.869 |
| | 8* | −2.310 | 0.749 | (=D45) | | |
| L5 | 9* | −12.374 | 0.668 | 1.6142 | 25.6 | f5 = −150.455 |
| | 10* | −14.580 | 0.318 | | | |
| L6 | 11* | −2.624 | 0.600 | 1.5348 | 55.7 | f6 = −5.172 |
| | 12* | −55.094 | 0.100 | | | |
| | 13 | ∞ | 0.210 | 1.5168 | 64.2 | |
| | 14 | ∞ | 0.638 | | | |
| (IM) | | ∞ | | | | |

Hmax = 3.894 mm

La = 5.731 mm f45 = −42.142 mm f56 = −4.894 mm $\Phi3 = 2.30$ mm $\Phi6 = 5.84$ mm

TABLE 10

Aspherical surface data

| i | k | A4 | A6 | A8 | A10 | A12 | A14 | A16 |
|---|---|---|---|---|---|---|---|---|
| 1 | 0 | 1.074E−04 | 6.227E−03 | −7.243E−03 | 4.295E−03 | −2.450E−03 | 1.488E−03 | −2.015E−04 |
| 2 | 0 | −5.467E−02 | 2.170E−01 | −3.653E−01 | 3.900E−01 | −2.641E−01 | 1.079E−01 | −2.066E−02 |
| 3 | 0 | −1.513E−01 | 3.339E−01 | −4.448E−01 | 3.721E−01 | −1.624E−01 | 2.829E−02 | −2.367E−03 |
| 4 | 0 | −9.979E−02 | 1.493E−01 | −1.054E−01 | 2.372E−02 | 6.639E−02 | −5.140E−02 | 8.851E−03 |
| 5 | 0 | −3.557E−02 | −5.265E−03 | −2.762E−02 | 5.050E−02 | −4.326E−02 | 2.497E−02 | −5.558E−03 |
| 6 | 0 | −8.186E−02 | 6.038E−03 | −4.782E−02 | −3.669E−03 | 6.545E−02 | −4.566E−02 | 8.025E−03 |
| 7 | 0 | −4.361E−02 | 1.141E−01 | −1.659E−01 | 1.236E−01 | −3.433E−02 | −1.620E−03 | −6.826E−04 |
| 8 | 0 | 1.575E−02 | 8.503E−02 | −4.292E−02 | 1.436E−02 | −4.702E−03 | 8.206E−04 | 1.732E−05 |
| 9 | 0 | −1.188E−01 | 1.022E−01 | −5.548E−02 | 1.182E−02 | 4.122E−04 | −9.004E−04 | 1.663E−04 |
| 10 | 0 | −1.340E−01 | 8.555E−02 | −2.660E−02 | 2.669E−03 | 4.065E−04 | −1.202E−04 | 8.332E−06 |
| 11 | 0 | −6.785E−02 | 3.889E−02 | −7.508E−03 | 7.403E−04 | −1.123E−05 | −6.447E−06 | 6.128E−07 |
| 12 | 0 | −3.759E−03 | −4.935E−03 | 8.386E−04 | −3.067E−05 | −3.452E−06 | 2.959E−07 | −1.144E−08 |

The values of the respective conditional expressions are as follows:

$D45/f=0.14$ $|R6r/R6f|=21.00$ $R6r/f=-9.99$ $f1/f2=-0.50$ $f2/f=-1.21$ $f3/f=1.70$ $f56/f=-0.89$ $f6/f=-0.94$ $D23/f=0.08$ $\phi6/\phi3=2.54$ $La/Hmax=1.47$ Accordingly, the imaging lens of Numerical Data Example 5 satisfies the above-described conditional expressions (1) through (15).

Figure 14:
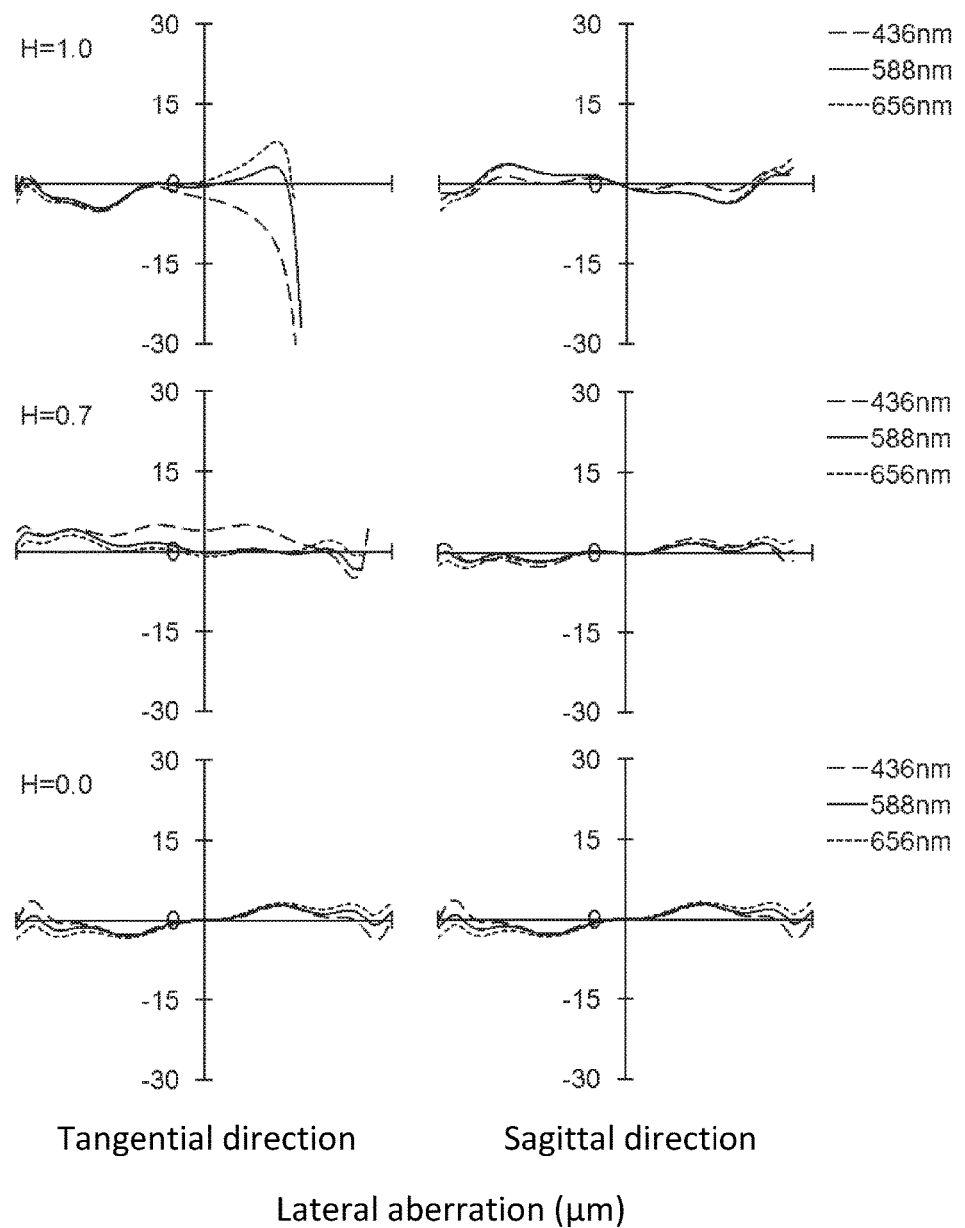
FIG. 14 is an aberration diagram showing a lateral aberration of the imaging lens of FIG. 13.
Figure 15:
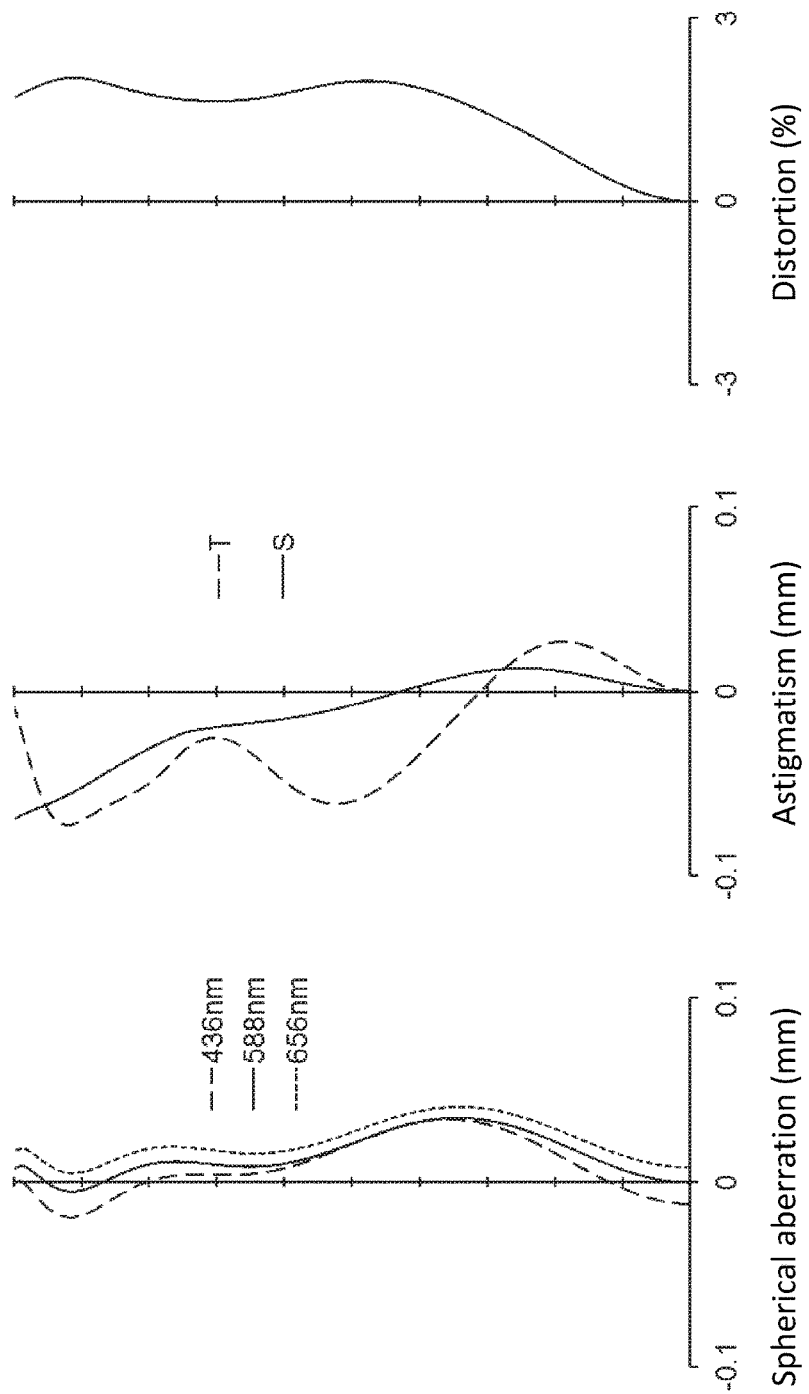
FIG. 15 is an aberration diagram showing a spherical aberration, astigmatism, and a distortion of the imaging lens of FIG. 13.
Figure 16:
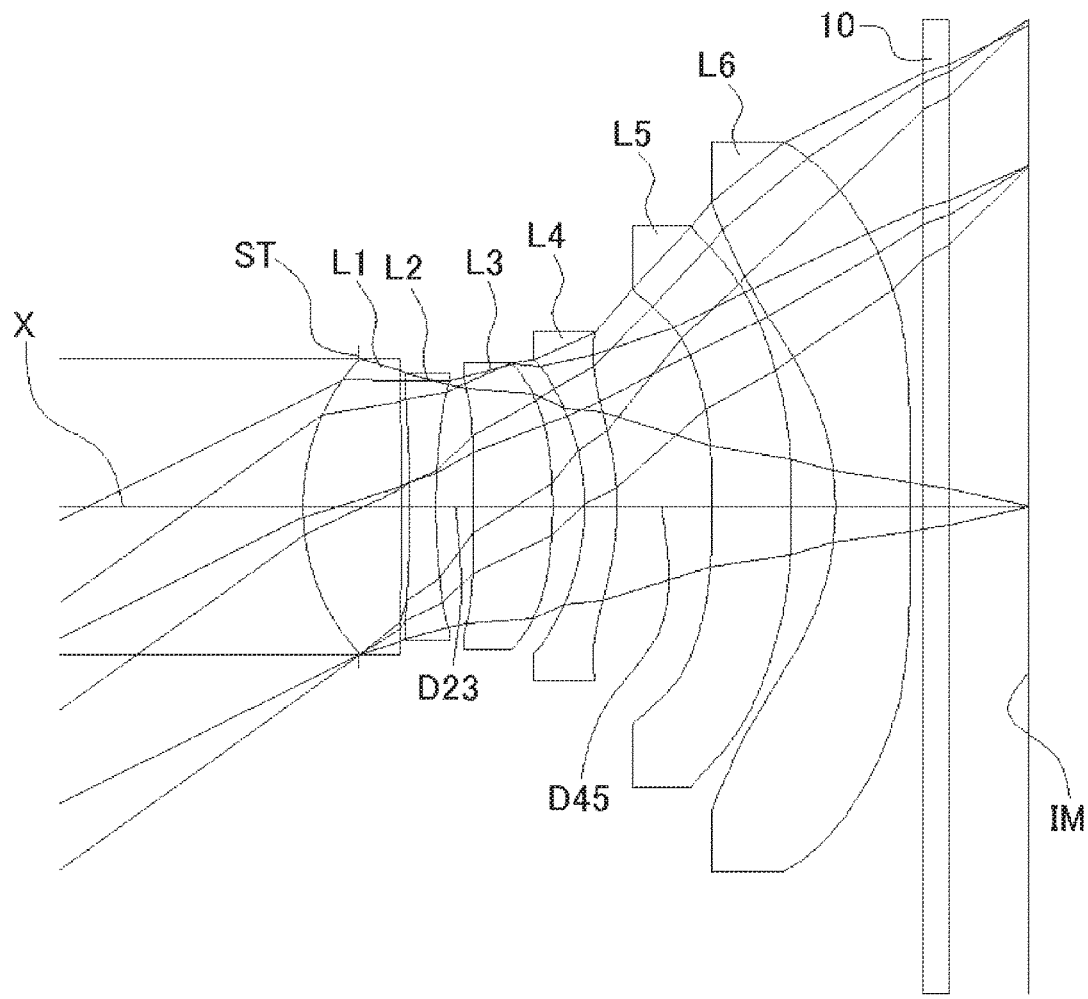
FIG. 16 shows a sectional view of a schematic configuration of an imaging lens in Numerical Data Example 6.

FIG. 14 shows a lateral aberration that corresponds to the image height ratio H, and FIG. 15 shows a spherical aberration (mm), astigmatism (mm), and a distortion (%), respectively. As shown in FIGS. 14 and 15, according to the imaging lens of Numerical Data Example 5, the aberrations are also satisfactorily corrected.

Numerical Data Example 6

Basic Lens Data

TABLE 11

| | i | r | d | nd | vd | [mm] |
|---|---|---|---|---|---|---|
| | | $\infty$ | $\infty$ | | | |
| L1 | 1* (ST) | 1.805 | 0.790 | 1.5348 | 55.7 | f1 = 3.249 |
| | 2* | -39.739 | 0.060 | | | |
| L2 | 3* | -35.053 | 0.210 | 1.6422 | 22.4 | f2 = -6.012 |
| | 4* | 4.349 | 0.299 (=D23) | | | |
| L3 | 5* | 465.673 | 0.638 | 1.5348 | 55.7 | f3 = 7.854 |
| | 6* | -4.236 | 0.255 | | | |
| L4 | 7* | -2.015 | 0.260 | 1.5348 | 55.7 | f4 = -50.324 |
| | 8* | -2.276 | 0.759 (=D45) | | | |
| L5 | 9* | -13.366 | 0.632 | 1.6142 | 25.6 | f5 = -93.286 |
| | 10* | -17.747 | 0.358 | | | |
| L6 | 11* | -2.625 | 0.600 | 1.5348 | 55.7 | f6 = -5.179 |
| | 12* | -54.051 | 0.100 | | | |
| | 13 | $\infty$ | 0.210 | 1.5168 | 64.2 | |
| | 14 | $\infty$ | 0.633 | | | |
| (IM) | | $\infty$ | | | | | f = 5.41 mm Fno = 2.3 ω = 35.8°

Hmax=3.894 mm

La=5.732 mm f45=-32.295 mm f56=-4.808 mm

Φ3=2.30 mm

Φ6=5.84 mm

TABLE 12

Aspherical surface data

| i | k | A4 | A6 | A8 | A10 | A12 | A14 | A16 |
|---|---|---|---|---|---|---|---|---|
| 1 | 0 | 6.466E-04 | 8.169E-03 | -6.569E-03 | 4.473E-03 | -2.516E-03 | 1.390E-03 | -3.046E-04 |
| 2 | 0 | -6.706E-02 | 2.156E-01 | -3.636E-01 | 3.914E-01 | -2.637E-01 | 1.075E-01 | -2.135E-02 |
| 3 | 0 | -1.424E-01 | 3.341E-01 | -4.461E-01 | 3.716E-01 | -1.621E-01 | 2.896E-02 | -1.791E-03 |
| 4 | 0 | -9.278E-02 | 1.477E-01 | -1.089E-01 | 2.061E-02 | 6.522E-02 | -5.023E-02 | 1.185E-02 |
| 5 | 0 | -6.342E-02 | -8.307E-03 | -2.529E-02 | 5.360E-02 | -4.185E-02 | 2.471E-02 | -8.001E-03 |
| 6 | 0 | -7.894E-02 | 8.528E-03 | -4.625E-02 | -3.034E-03 | 6.538E-02 | -4.591E-02 | 7.971E-03 |
| 7 | 0 | -4.189E-02 | 1.152E-01 | -1.653E-01 | 1.238E-01 | -3.416E-02 | -1.860E-03 | -1.049E-03 |
| 8 | 0 | 9.893E-03 | 8.493E-02 | -4.248E-02 | 1.462E-02 | -4.625E-03 | 8.413E-04 | 9.650E-06 |
| 9 | 0 | -1.242E-01 | 1.031E-01 | -5.508E-02 | 1.186E-02 | 4.091E-04 | -9.043E-04 | 1.649E-04 |
| 10 | 0 | -1.332E-01 | 8.567E-02 | -2.656E-02 | 2.677E-03 | 4.068E-04 | -1.203E-04 | 8.300E-06 |
| 11 | 0 | -6.851E-02 | 3.892E-02 | -7.508E-03 | 7.403E-04 | -1.111E-05 | -6.429E-06 | 6.158E-07 |
| 12 | 0 | -4.158E-03 | -4.916E-03 | 8.538E-04 | -3.029E-05 | -3.623E-06 | 2.829E-07 | -9.740E-09 |

The values of the respective conditional expressions are as follows:

$D45/f=0.14$ $|R6r/R6f|=20.59$ $R6r/f=-10.00$ $f1/f2=-0.54$ $f2/f=-1.11$ $f3/f=1.45$ $f56/f=-0.89$ $f6/f=-0.96$ $D23/f=0.06$ $\Phi6/\Phi3=2.54$ $La/H\text{max}=1.47$ Accordingly, the imaging lens of Numerical Data Example 6 satisfies the above-described conditional expressions (1) through (15).

Figure 17:
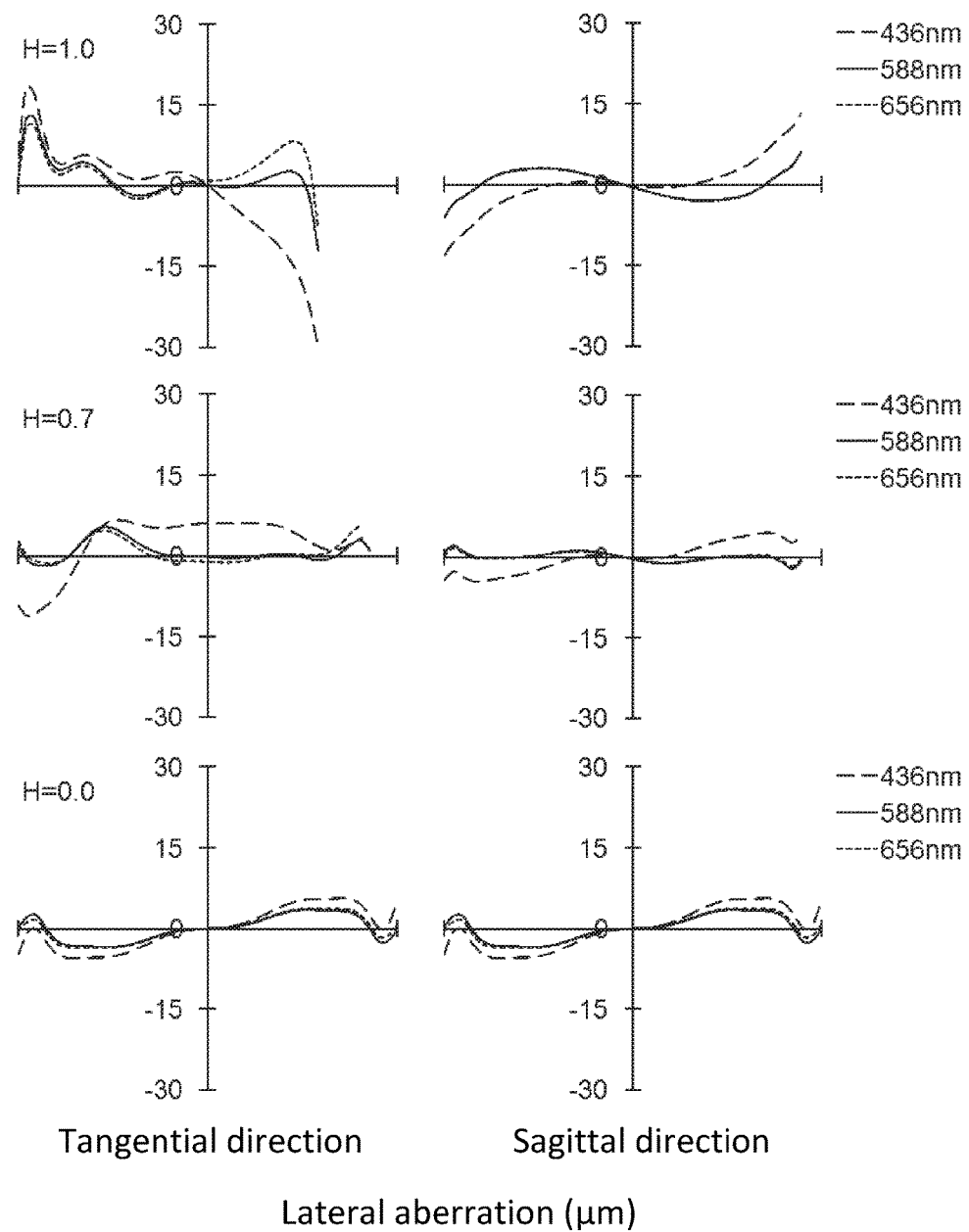
FIG. 17 is an aberration diagram showing a lateral aberration of the imaging lens of FIG. 16.
Figure 18:
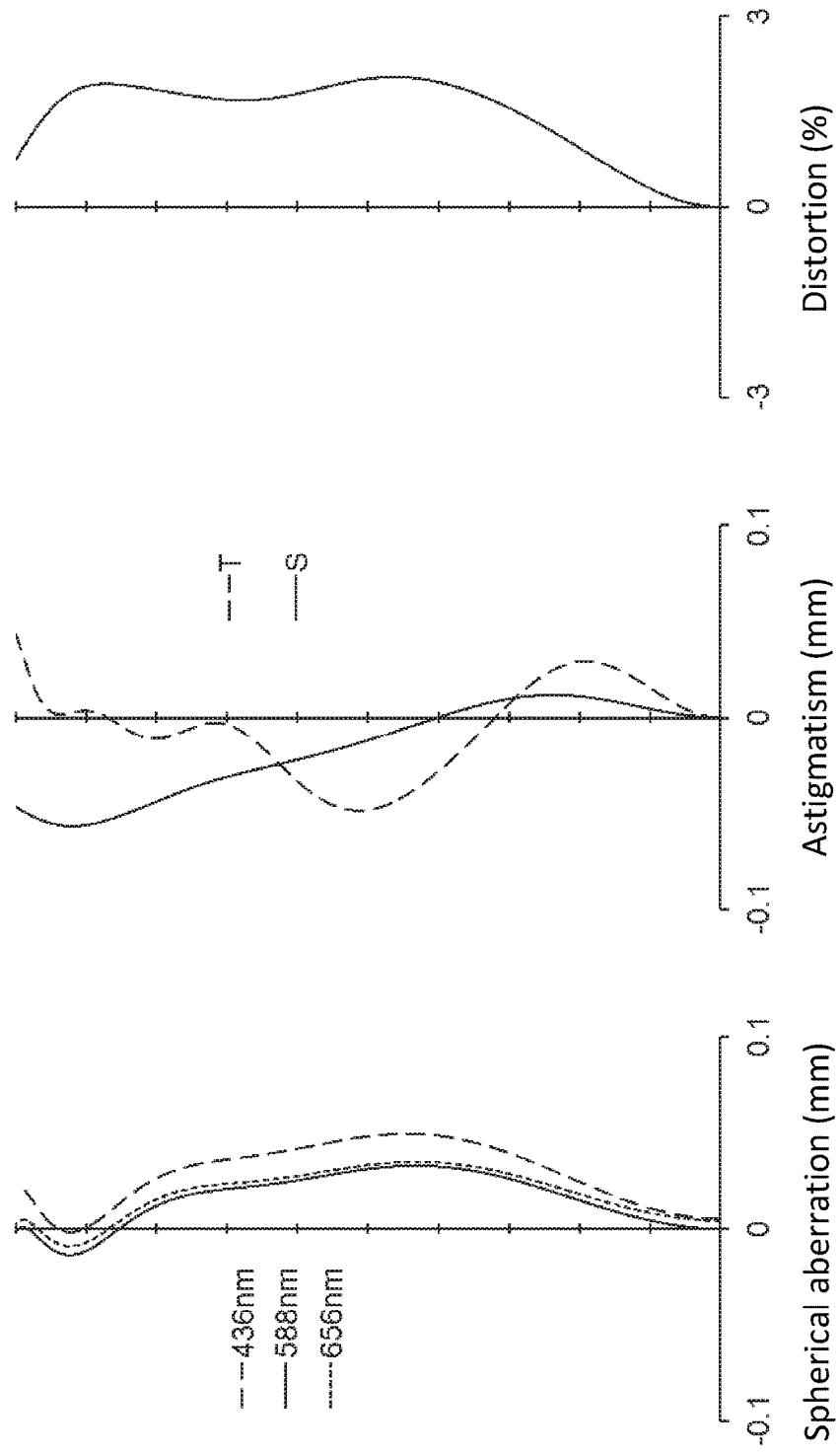
FIG. 18 is an aberration diagram showing a spherical aberration, astigmatism, and a distortion of the imaging lens of FIG. 16.

FIG. 17 shows a lateral aberration that corresponds to the image height ratio H, and FIG. 18 shows a spherical aberration (mm), astigmatism (mm), and a distortion (%), respectively. As shown in FIGS. 17 and 18, according to the imaging lens of Numerical Data Example 6, the aberrations are also satisfactorily corrected.

As described above, according to the imaging lens of the embodiment described above, it is achievable to have very wide angle of view (2ω) of 70° or greater. More specifically, according to Numerical Data Examples 1 to 6, the imaging lenses have wide angles of view of 70.4° to 76.6°. According to the imaging lens of the embodiment, it is possible to take an image over a wider range than that taken by a conventional imaging lens.

Accordingly, when the imaging lens of the embodiment is mounted in an imaging optical system, such as cameras built in portable devices including cellular phones, smartphones, and portable information terminals, digital still cameras, security cameras, onboard cameras, and network cameras, it is possible to attain both high performance and downsizing of the cameras.

The present invention is applicable to an imaging lens to be mounted in relatively small cameras, such as cameras to be built in portable devices including cellular phones, smartphones, and portable information terminals, digital still cameras, security cameras, vehicle onboard cameras, and network cameras.

The disclosure of Japanese Patent Application No. 2016-166945, filed on Aug. 29, 2016, is incorporated in the application by reference.

While the present invention has been explained with reference to the specific embodiment of the present invention, the explanation is illustrative and the present invention is limited only by the appended claims.

What is claimed is:

1. An imaging lens comprising:
   a first lens having positive refractive power;
   a second lens having negative refractive power;
   a third lens having positive refractive power;
   a fourth lens;
   a fifth lens having negative refractive power; and
   a sixth lens having negative refractive power, arranged in this order from an object side to an image plane side,
   wherein said third lens is formed in a shape so that a curvature radius of a surface thereof on the image plane side is negative,
   said fifth lens is formed in a shape so that a curvature radius of a surface thereof on the object side is negative,
   said sixth lens is formed in a shape so that a curvature radius of a surface thereof on the object side and a curvature radius of a surface thereof on the image plane side are negative, and
   said first lens has a focal length f1, said second lens has a focal length f2, said fourth lens is arranged to be away from the fifth lens by a distance D45 on an optical axis thereof, and said sixth lens is formed in the shape so that the surface thereof on the image plane side has a curvature radius R6r so that the following conditional expressions are satisfied:

$f1<|f2|$ $0.02<D45/f<0.5$ $-80<R6r/f<-5$ where f is a focal length of a whole lens system.

2. The imaging lens according to claim 1, wherein said sixth lens is formed in a shape so that a surface thereof on the object side has a curvature radius R6f and a surface thereof on the image plane side has a curvature radius R6r so that the following conditional expression is satisfied:

$3<|R6r/R6f|<150$.

3. The imaging lens according to claim 1, wherein said first lens has a focal length f1 and said second lens has a focal length f2 so that the following conditional expression is satisfied:

$-1.0<f1/f2<-0.1$.

4. The imaging lens according to claim 1, wherein said third lens has a focal length f3 so that the following conditional expression is satisfied:

$1<f3/f<5$.

5. The imaging lens according to claim 1, wherein said fifth lens and said sixth lens have a composite focal length f56 so that the following conditional expression is satisfied:

$-2.0<f56/f<-0.1$.

6. The imaging lens according to claim 1, wherein said sixth lens has a focal length f6 so that the following conditional expression is satisfied:

$-3.0<f6/f<-0.5$.

7. The imaging lens according to claim 1, wherein said third lens is formed in a shape so that a surface thereof on the image plane side has an effective diameter Φ3, and said sixth lens is formed in the shape so that the surface thereof on the image plane side has an effective diameter Φ6 so that the following conditional expression is satisfied:

$1.5<\Phi6/\Phi3<3$.

8. The imaging lens according to claim 1, wherein said second lens is arranged to be away from the third lens by a distance D23 on an optical axis thereof so that the following conditional expression is satisfied:

$0.01<D23/f<0.5$.

9. An imaging lens comprising:
   a first lens having positive refractive power;
   a second lens having negative refractive power;

a third lens having positive refractive power;
a fourth lens;
a fifth lens having negative refractive power; and
a sixth lens having negative refractive power, arranged in this order from an object side to an image plane side,
wherein said third lens is formed in a shape so that a curvature radius of a surface thereof on the image plane side is negative,
said fifth lens is formed in a shape so that a curvature radius of a surface thereof on the object side is negative,
said sixth lens is formed in a shape so that a curvature radius of a surface thereof on the object side and a curvature radius of a surface thereof on the image plane side are negative, and
said fourth lens is arranged to be away from the fifth lens by a distance D45 on an optical axis thereof, said first lens is arranged so that a surface thereof on the object side is away from an image plane by a distance La on an optical axis thereof, and said imaging lens has an angle of view 2ω so that the following conditional expressions are satisfied:

$0.02 < D45/f < 0.5$ $1.2 < La/Hmax < 1.8$ $70° \leq 2\omega$ where f is a focal length of a whole lens system and Hmax is a maximum image height of the image plane.

10. The imaging lens according to claim 9, wherein said sixth lens is formed in a shape so that a surface thereof on the object side has a curvature radius R6f and a surface thereof on the image plane side has a curvature radius R6r so that the following conditional expression is satisfied:

$3 < |R6r/R6f| < 150$.

11. The imaging lens according to claim 9, wherein said first lens has a focal length f1 and said second lens has a focal length f2 so that the following conditional expression is satisfied:

$-1.0 < f1/f2 < -0.1$.

12. The imaging lens according to claim 9, wherein said third lens has a focal length f3 so that the following conditional expression is satisfied:

$1 < f3/f < 5$.

13. The imaging lens according to claim 9, wherein said fifth lens and said sixth lens have a composite focal length f56 so that the following conditional expression is satisfied:

$-2.0 < f56/f < -0.1$.

14. The imaging lens according to claim 9, wherein said sixth lens has a focal length f6 so that the following conditional expression is satisfied:

$-3.0 < f6/f < -0.5$.

15. An imaging lens comprising:
a first lens having positive refractive power;
a second lens having negative refractive power;
a third lens having positive refractive power;
a fourth lens having positive refractive power;
a fifth lens having negative refractive power; and
a sixth lens having negative refractive power, arranged in this order from an object side to an image plane side,
wherein said third lens is formed in a shape so that a curvature radius of a surface thereof on the object side is positive and a curvature radius of a surface thereof on the image plane side is negative,
said sixth lens is formed in a shape so that a curvature radius of a surface thereof on the object side and a curvature radius of a surface thereof on the image plane side are negative, and
said first lens has a focal length f1, said second lens has a focal length f2, said fourth lens is arranged to be away from the fifth lens by a distance D45 on an optical axis thereof so that the following conditional expressions are satisfied:

$f1 < |f2|$ $0.05 < D45/f < 0.5$ where f is a focal length of a whole lens system.

16. The imaging lens according to claim 15, wherein said fourth lens has a focal length f4 so that the following conditional expression is satisfied:

$0.5 < f4/f < 5.0$.

17. The imaging lens according to claim 15, wherein said third lens has a focal length f3 and said fourth lens has a focal length f4 so that the following conditional expression is satisfied:

$0.5 < f3/f4 < 4.5$.

18. The imaging lens according to claim 15, wherein said fourth lens and said fifth lens have a composite focal length f45 so that the following conditional expression is satisfied:

$2 < f45/f < 8$.

19. The imaging lens according to claim 15, wherein said first lens is arranged so that a surface thereof on the object side is away from an image plane by a distance La on an optical axis thereof so that the following conditional expression is satisfied:

$1.2 < La/Hmax < 1.8$ where Hmax is a maximum image height of the image plane.

* * * * *